(12) United States Patent
Kasai et al.

(10) Patent No.: US 8,243,328 B2
(45) Date of Patent: Aug. 14, 2012

(54) PRINTING METHOD, PRINTING APPARATUS, AND STORAGE MEDIUM STORING A PROGRAM

(75) Inventors: Tsuneo Kasai, Azumino (JP); Kaori Matsumoto, Shiojiri (JP); Hirokazu Kasahara, Okaya (JP); Kenji Fukasawa, Matsumoto (JP); Naoki Kuwata, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1153 days.

(21) Appl. No.: 12/106,153

(22) Filed: Apr. 18, 2008

(65) Prior Publication Data

US 2008/0259372 A1  Oct. 23, 2008

(30) Foreign Application Priority Data

Apr. 20, 2007 (JP) ................................. 2007-112225
Dec. 11, 2007 (JP) ................................. 2007-319982

(51) Int. Cl.
*G06F 15/00* (2006.01)

(52) U.S. Cl. ...... 358/1.9; 358/1.13; 358/1.15; 358/1.18; 358/505; 382/159; 382/190; 382/224

(58) Field of Classification Search ........................ None
See application file for complete search history.

(56) References Cited

U.S. PATENT DOCUMENTS

| | | | |
|---|---|---|---|
| 7,570,379 B2 * | 8/2009 | Wiechers et al. | 358/1.15 |
| 2002/0051201 A1 * | 5/2002 | Winter et al. | 358/1.16 |
| 2005/0200923 A1 * | 9/2005 | Shimada et al. | 358/537 |
| 2005/0220341 A1 * | 10/2005 | Akahori | 382/170 |
| 2006/0103866 A1 * | 5/2006 | Saka et al. | 358/1.13 |
| 2008/0292181 A1 * | 11/2008 | Kasai et al. | 382/159 |

FOREIGN PATENT DOCUMENTS

| | | |
|---|---|---|
| JP | 2001-238177 | 8/2001 |
| JP | 2002-314831 | 10/2002 |
| JP | 2002-314937 | 10/2002 |
| JP | 2002-344881 | 11/2002 |
| JP | 2002-344989 | 11/2002 |
| JP | 2003-006666 | 1/2003 |
| JP | 2003-052002 | 2/2003 |
| JP | 2003-060935 | 2/2003 |
| JP | 2003-101940 | 4/2003 |
| JP | 2003-348343 | 12/2003 |
| JP | 2004-082703 | 3/2004 |
| JP | 2004-112756 | 4/2004 |
| JP | 2004-215311 | 7/2004 |
| JP | 2007-194917 | 8/2007 |
| JP | 2007-228118 | 9/2007 |
| WO | WO 03/036960 | 5/2003 |

* cited by examiner

*Primary Examiner* — Marivelisse Santiago Cordero
*Assistant Examiner* — Miya J Cato
(74) *Attorney, Agent, or Firm* — DLA Piper LLP (US)

(57) ABSTRACT

A printing method includes obtaining scene information concerning image data from supplemental data that is appended to the image data; classifying a scene of an image represented by the image data, based on the image data; comparing the classified scene with a scene indicated by the scene information; and printing a printout that is used to urge a user to make a continuation when a mismatch between the classified scene and the scene indicated by the scene information exists.

4 Claims, 28 Drawing Sheets

| TAG NAME |
|---|
| TITLE |
| MANUFACTURER |
| MODEL |
| RESOLUTION IN X DIRECTION |
| RESOLUTION IN Y DIRECTION |
| ⋮ |
| COPYRIGHT INFORMATION |
| ExifIFDPointer |

| TAG NAME |
|---|
| EXPOSURE TIME |
| LENS F NUMBER |
| EXPOSURE CONTROL MODE |
| ISO SENSITIVITY |
| Exif VERSION |
| ⋮ |
| LIGHT SOURCE |
| FLASH |
| LENS FOCAL LENGTH |
| MakerNote |
| ⋮ |
| 35 MM EQUIVALENT LENS FOCAL LENGTH |
| SCENE CAPTURE TYPE |
| ⋮ |

FIG. 4A          FIG. 4B

| SETTING (MODE NAME) | | SCENE CAPTURE TYPE DATA (Exif SubIFD AREA) | SHOOTING MODE DATA (Makernote IFD AREA) |
|---|---|---|---|
| AUTO | AUTO | 0 | 0 |
| 👤 | PORTRAIT | 2 | 1 |
| ⛰ | LANDSCAPE | 1 | 2 |
| 🌷 | CLOSE-UP | 0 | 3 |
| 🏃 | SPORT | 0 | 4 |
| 🌅 | SUNSET SCENE | 0 | 5 |
| 👤★ | NIGHT SCENE | 3 | 6 |
| ⋮ | | ⋮ | ⋮ |

FIG. 5

| SCENE | ITEM-BY-ITEM ENHANCEMENT DETAILS ||||||||||
|---|---|---|---|---|---|---|---|---|---|---|
| | CONTRAST | BRIGHTNESS | COLOR BALANCE | SATURATION | SHARPNESS | SKY BLUE | MEMORY COLOR ||| NOISE REMOVAL |
| | | | | | | | GREEN | SKIN | RED | |
| WITHOUT ENHANCEMENT | OFF | OFF | OFF | OFF | OFF | OFF | OFF | OFF | OFF | OFF |
| OTHER | NORMAL | NORMAL | NORMAL | NORMAL | NORMAL | OFF | OFF | OFF | OFF | OFF |
| PORTRAIT | SLIGHTLY SOFT | SLIGHTLY BRIGHT | NORMAL | SLIGHTLY HIGH | SLIGHTLY WEAK | OFF | OFF | ON | OFF | OFF |
| LANDSCAPE | SLIGHTLY SHARP | SLIGHTLY DARK | NORMAL | SLIGHTLY HIGH | SLIGHTLY STRONG | ON | ON | OFF | OFF | OFF |
| SUNSET SCENE | NORMAL | OFF | WARM TONE | NORMAL | SLIGHTLY WEAK | OFF | OFF | OFF | ON | ON |
| NIGHT SCENE | NORMAL | DARK | OFF | NORMAL | NORMAL | OFF | OFF | OFF | OFF | ON |
| FLOWER | SLIGHTLY SOFT | SLIGHTLY BRIGHT | WEAK | SLIGHTLY HIGH | NORMAL | OFF | ON | OFF | OFF | OFF |
| AUTUMNAL | NORMAL | NORMAL | NORMAL | SLIGHTLY HIGH | SLIGHTLY STRONG | OFF | OFF | OFF | ON | OFF |

FIG. 7

|  | LANDSCAPE | SUNSET SCENE | NIGHT SCENE | FLOWER | AUTUMNAL |
|---|---|---|---|---|---|
| POSITIVE | O | O | O | O | O |
| NEGATIVE | O | O | O | O | O |

| | | CLASSIFICATION RESULT | |
|---|---|---|---|
| | | P (Positive) | N (Negative) |
| TRUE SOLUTION | P | TP (True Positive) | FN (False Negative) |
| | N | FP (False Positive) | TN (True Negative) |

$$\text{RECALL (RECALL RATIO, DETECTION RATE)} = \frac{TP}{TP + FN}$$

$$\text{PRECISION (RATIO OF CORRECT ANSWERS, ACCURACY RATE)} = \frac{TP}{TP + FP}$$

FIG. 13

| 31 | 27 | 20 | 39 | 24 | 19 | 17 | 29 |
|----|----|----|----|----|----|----|----|
| 30 | 38 | 28 | 33 | 32 | 36 | 23 | 40 |
| 25 | 6  | 7  | 52 | 22 | 21 | 16 | 1  |
| 14 | 37 | 26 | 35 | 15 | 8  | 3  | 9  |
| 18 | 45 | 46 | 2  | 4  | 10 | 34 | 48 |
| 47 | 5  | 13 | 43 | 42 | 51 | 12 | 53 |
| 11 | 41 | 44 | 50 | 54 | 49 | 56 | 55 |
| 59 | 60 | 58 | 61 | 57 | 63 | 64 | 62 |

FIG. 18

PRINTING METHOD, PRINTING APPARATUS, AND STORAGE MEDIUM STORING A PROGRAM

CROSS-REFERENCE TO RELATED APPLICATIONS

The present application claims priority upon Japanese Patent Application No. 2007-112225 filed on Apr. 20, 2007, and No. 2007-319982 filed on Dec. 11, 2007, which are herein incorporated by reference.

BACKGROUND

1. Technical Field

The present invention relates to printing methods, printing apparatuses, and storage media storing a program.

2. Related Art

There are digital still cameras that have mode setting dials for setting the shooting mode. When the user sets a shooting mode using the dial, the digital still camera determines shooting conditions (such as exposure time) according to the shooting mode and takes a picture. When the picture is taken, the digital still camera generates an image file. This image file contains image data concerning the photographed image and supplemental data concerning, for example, the shooting conditions when photographing the image, which is appended to the image data.

On the other hand, it is also common to subject the image data to image processing according to the supplemental data. For example, when a printer performs printing based on the image file, the image data is enhanced according to the shooting conditions indicated by the supplemental data and printing is performed in accordance with the enhanced image data.

A patent document that is mentioned here is JP-A-2001-238177.

When a digital still camera creates an image file, scene information in accordance with the dial settings may be stored in the supplemental data. On the other hand, when the user forgets to set the shooting mode, scene information that does not match the content of the image data may be stored in the supplemental data. Therefore, the scene of the image data may be classified by analyzing the image data, without using the scene information of the supplemental data. However, when a mismatch between the scene indicated by the supplemental data and the scene of the classification result exists, it is desirable that the user makes a confirmation.

It is an object of the present invention to facilitate the user's confirmation operation when the user makes a confirmation.

SUMMARY

In order to attain the above-noted object, a printing method is provided that includes obtaining scene information concerning image data from supplemental data that is appended to the image data; classifying a scene of an image represented by the image data, based on the image data; comparing the classified scene with a scene indicated by the scene information; and printing a printout that is used to urge a user to make a confirmation when a mismatch between the classified scene and the scene indicated by the scene information exists.

Other features of the present invention will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 4A is an explanatory diagram of tags used in IFD0; FIG. 4B is an explanatory diagram of tags used in Exif Sub-IFD;

FIG. 5 is a correspondence table that shows the correspondence between the settings of a mode setting dial and data;

FIG. 7 is an explanatory diagram of the relationship between scenes of images and enhancement details;

FIG. 13 is an explanatory diagram of Recall and Precision;

FIG. 18 is an explanatory diagram of the order in which partial images are selected by a sunset scene partial classifier;

DESCRIPTION OF EXEMPLARY EMBODIMENTS

Figure 1:
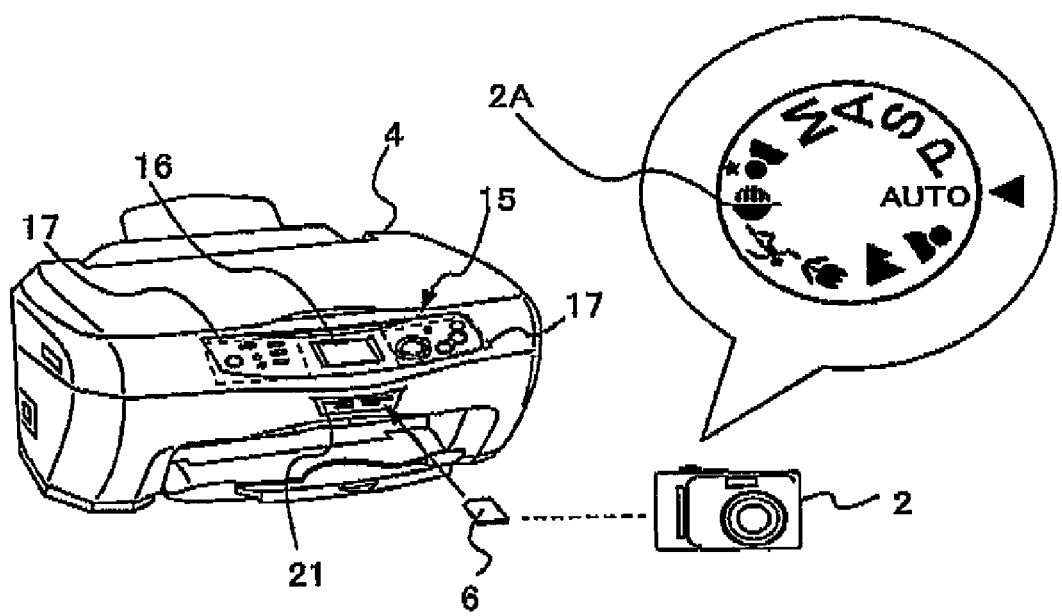
FIG. 1 is an explanatory diagram illustrating an image processing system.

At least the following matters will be made clear by the explanation in the present specification and the description of the accompanying drawings.

A printing method is provided that includes obtaining scene information concerning image data from supplemental data that is appended to the image data; classifying a scene of an image represented by the image data, based on the image data; comparing the classified scene with a scene indicated by the scene information; and printing a printout that is used to urge a user to make a confirmation when a mismatch between the classified scene and the scene indicated by the scene information exists.

With such a printing method, the confirmation operation by the user can be made easier.

It is preferable that the method further comprises reading in a printout on which the user has filled out printing instructions; enhancing the image data based on at least one of the scene indicated by the scene information and the classified scene, in accordance with the result of the reading in; and printing an image represented by the enhanced image data. Thus, an image with the image quality desired by the user is attained.

It is preferable that, when printing the printout, at least an image enhanced based on the scene indicated by the scene information and an image enhanced based on the classified scene are printed next to one another. Thus, the user can compare the results of the enhancement processing more easily.

It is preferable that the scene indicated by the scene information and the classified scene are compared for the image data of each of a plurality of images; for the image data of each of the images, an image represented by the image data of the plurality of images is printed on the printout and an instruction region is provided with which the user can give an instruction of a scene; in the instruction region of image data for which a mismatch between the scene indicated by the scene information and the classified scene exists, a mark used to give an instruction of the scene indicated by the scene information and a mark used to give an instruction of the classified scene are printed; and in the instruction region of image data for which a match between the scene indicated by the scene information and the classified scene exists, a mark used to give an instruction of at least one of the scene indicated by the scene information and the classified scene is printed. Thus, the user can easily determine for which image a mismatch between the two scenes exists.

It is preferable that, in the instruction region of image data for which a mismatch between the scene indicated by the scene information and the classified scene exists, either one of the mark used to give an instruction of the scene indicated by the scene information and the mark used to give an instruction of the classified scene is printed in an emphasized manner; and when an image represented by image data for which a mismatch between the scene indicated by the scene information and the classified scene exists is printed, and neither the mark used to give an instruction of the scene indicated by the scene information nor the mark used to give an instruction of the classified scene is filled out, then the image data is enhanced based on the scene indicated by the mark that is printed in an emphasized manner, and the image represented by this enhanced image data is printed. By printing a given mark in an emphasized manner, the user can recognize which processing is carried out when nothing is filled out.

It is preferable that the scene indicated by the scene information and the classified scene are compared for the image data of each of a plurality of images; a printout is printed for the image data for which a mismatch between the scene indicated by the scene information and the classified scene exists; and printing of image data for which a match between the scene indicated by the scene information and the classified scene exists is started before reading in the printout on which the user has filled out the printing instructions. Thus, the printing can be started earlier.

It is preferable that the content of the printing instructions is stored in the supplemental data in accordance with the result of the reading in. Thus, it becomes unnecessary to perform the classification processing again.

Furthermore, a printing apparatus is provided that includes a controller, which:

obtains scene information concerning image data from supplemental data that is appended to the image data;

classifies a scene of an image represented by the image data, based on the image data;

compares the classified scene with a scene indicated by the scene information; and prints a printout that is used to urge a user to make a confirmation when a mismatch between the classified scene and the scene indicated by the scene information exists.

With such a printing apparatus, the confirmation operation by the user can be made easier.

Furthermore, a storage medium is provided that stores a program causing a printing apparatus to:

obtain scene information concerning image data from supplemental data that is appended to the image data;

classify a scene of an image represented by the image data, based on the image data;

compare the classified scene with a scene indicated by the scene information; and print a printout that is used to urge a user to make a confirmation when a mismatch between the classified scene and the scene indicated by the scene information exists.

With such a storage medium storing a program, the confirmation operation by the user can be made easier.

Overall Configuration

FIG. 1 is an explanatory diagram of an image processing system. This image processing system includes a digital still camera 2 and a printer 4.

The digital still camera 2 captures a digital image by forming an image of a photographic subject onto a digital device (such as a CCD). The digital still camera 2 is provided with a mode setting dial 2A. With this dial 2A, the user can set shooting modes in accordance with the shooting conditions. For example, when the dial 2A is set to the "night scene" mode, the digital still camera 2 reduces the shutter speed or increases the ISO sensitivity to take a picture with shooting conditions suitable for photographing a night scene.

The digital still camera 2 saves the image file generated by the image-taking to a memory card 6 in conformity with the file format specifications. The image file contains not only the digital data (image data) of the captured image, but also supplemental data, such as the shooting conditions (shooting data), when the picture was shot.

The printer 4 is a printing apparatus that prints an image represented by the image data on paper. The printer 4 is provided with a slot 21 into which the memory card 6 is inserted. After taking a picture with the digital still camera 2, the user can remove the memory card 6 from the digital still camera 2 and insert the memory card 6 into the slot 21.

A panel section 15 includes a display section 16 and an input section 17 with various buttons. The display section 16 is constituted by a liquid crystal display. If the display section 16 is a touch panel, then the display section 16 functions also as the input section 17. The display section 16 displays, for example, a setting screen for performing settings on the printer 4, images of the image data read in from the memory card, or screens for confirmations or warnings directed at the user.

Figure 2:
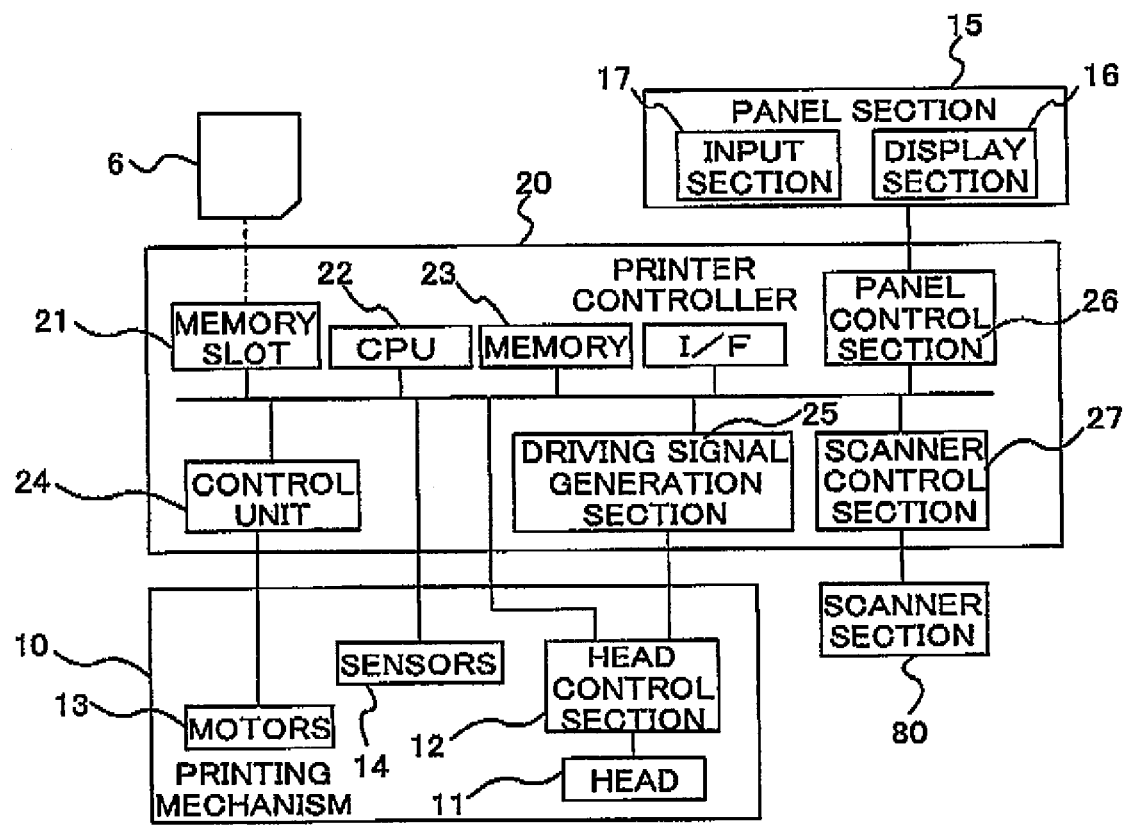
FIG. 2 is an explanatory diagram of the configuration of a printer.

FIG. 2 is an explanatory diagram of a configuration of the printer 4. The printer 4 includes a printing mechanism 10 and a printer controller 20 for controlling the printing mechanism 10. The printing mechanism 10 includes a head 11 that ejects ink, a head control section 12 that controls the head 11, motors 13 for, for example, transporting paper, and sensors 14. The printer controller 20 includes the memory slot 21 for sending/receiving data to/from the memory card 6, a CPU 22, a memory 23, a control unit 24 that controls the motors 13, and a driving signal generation section 25 that generates driving signals (driving waveforms). Moreover, the printer controller 20 also includes a panel control section 26 controlling the panel section 15.

When the memory card 6 is inserted into the slot 21, the printer controller 20 reads out the image file saved on the memory card 6 and stores the image file in the memory 23. Then, the printer controller 20 converts the image data of the image files into print data to be printed by the printing mechanism 10 and controls the printing mechanism 10 based on the print data to print the images on paper. This sequence of operations is called "direct printing."

It should be noted that "direct printing" is performed not only by inserting the memory card 6 into the slot 21, but also can be performed by connecting the digital still camera 2 to the printer 4 via a cable (not shown). The panel section 15 is used for the settings for direct printing.

Furthermore, the printer 4 incorporates a scanner section 80. The printer controller 20 includes a scanner control section 27 that controls the scanner section 80. The printer controller 20 controls the scanner section 80 through the scanner control section 27, and obtains image data representing an image of an original from the scanner section 80 by reading in the original with the scanner section 80.

Structure of Image File

An image file is constituted by image data and supplemental data. The image data is constituted by pixel data of a plurality of pixels. The pixel data is data indicating color information (a tone value) of each pixel. An image is made up of pixels arranged in a matrix form. Accordingly, the image data is data representing an image. The supplemental data includes data indicating the properties of the image data, shooting data, thumbnail image data, and the like.

Hereinafter, a specific structure of an image file is described.

Figure 3:
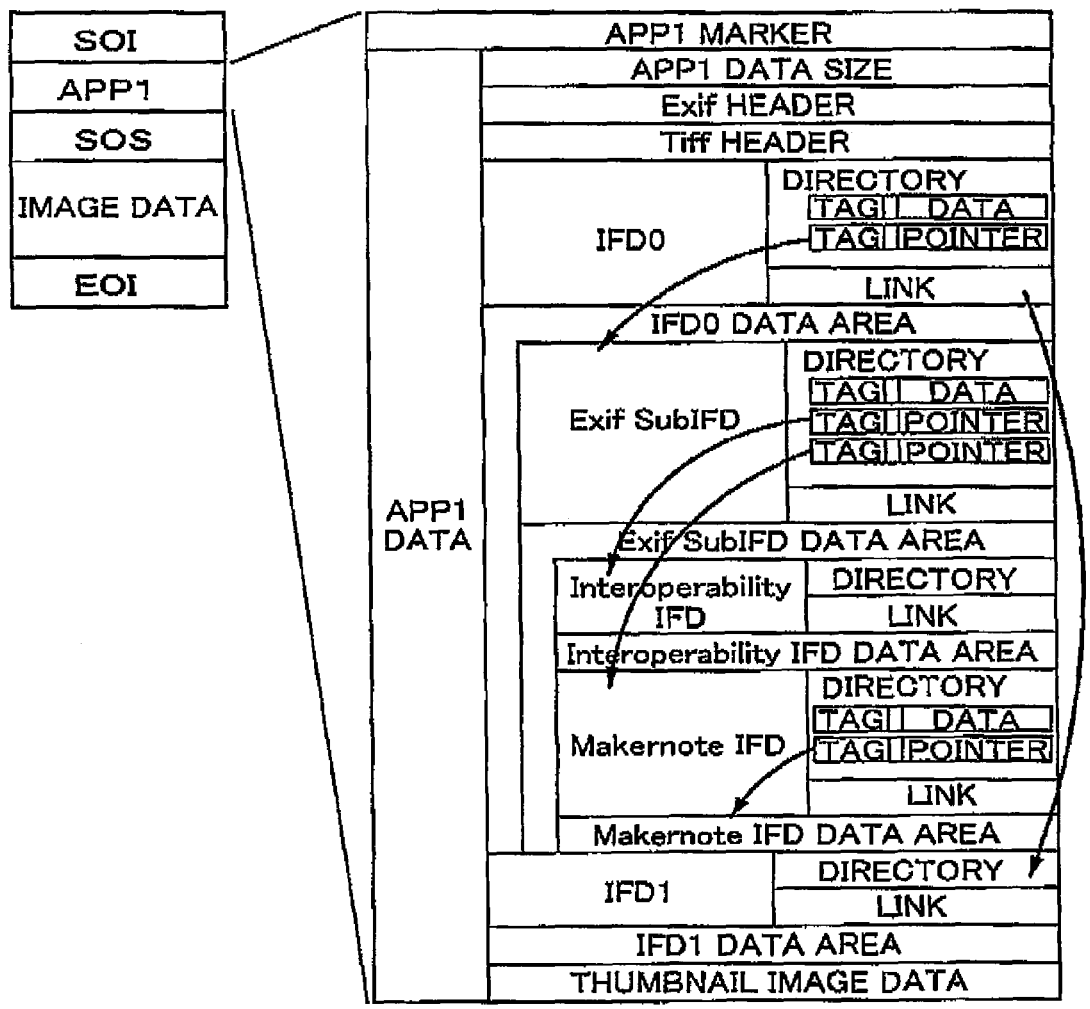
FIG. 3 is an explanatory diagram of a structure of an image file.

FIG. 3 is an explanatory diagram of a structure of an image file. An overall configuration of the image file is shown on the left side of the figure, and the configuration of an APP1 segment is shown on the right side of the figure.

The image file begins with a marker indicating SOI (Start of image) and ends with a marker indicating EOI (End of image). The marker indicating SOI is followed by an APP1 marker indicating the start of a data area of APP1. The data area of APP1 after the APP1 marker contains supplemental data, such as shooting data and a thumbnail image. Moreover, image data is included after a marker indicating SOS (Start of Stream).

After the APP1 marker, information indicating the size of the data area of APP1 is placed, which is followed by an EXIF header, a TIFF header, and then IFD areas.

Every IFD area has a plurality of directory entries, a link indicating the location of the next IFD area, and a data area. For example, the first IFD, which is IFD0 (IFD of main image), links to the location of the next IFD, IFD1 (IFD of thumbnail image). However, there is no further IFD following the IFD1 here, so that the IFD1 does not link to any other IFDs. Every directory entry contains a tag and a data section. When a small amount of data is to be stored, the data section stores actual data as it is, whereas when a large amount of data is to be stored, actual data is stored in an IFD0 data area and the data section stores a pointer indicating the storage location of the data. It should be noted that the IFD0 contains a directory entry in which a tag (Exif IFD Pointer), meaning the storage location of an Exif SubIFD, and a pointer (offset value), indicating the storage location of the Exit SubIFD, are stored.

The Exif SubIFD area has a plurality of directory entries. These directory entries also contain tags and data sections. When a small amount of data is to be stored, the data sections store actual data as it is, whereas when a large amount of data is to be stored, the actual data is stored in an Exif SubIFD data area and the data sections store pointers indicating the storage location of the data. It should be noted that the Exif SubIFD stores a tag meaning the storage location of a Makernote IFD and a pointer indicating the storage location of the Makernote IFD.

The Makernote IFD area has a plurality of directory entries. These directory entries also contain tags and data sections. When a small amount of data is to be stored, the data sections store actual data as it is, whereas when a large amount of data is to be stored, the actual data is stored in a Makernote IFD data area and the data sections store pointers indicating the storage location of the data. However, regarding the Makernote IFD area, the data storage format can be defined freely, so that data is not necessarily stored in this format. In the following description, data stored in the Makernote IFD area is referred to as "MakerNote data."

FIG. 4A is an explanatory diagram of tags used in IFD0. As shown in the diagram, the IFD0 stores general data (data indicating the properties of the image data) and no detailed shooting data.

FIG. 4B is an explanatory diagram of tags used in Exit SubIFD. As shown in the diagram, the Exif SubIFD stores detailed shooting data. It should be noted that most of shooting data that is extracted during scene classification processing is shooting data stored in the Exif SubIFD. The scene capture type tag (Scene Capture Type) is a tag indicating the type of a photographed scene. Moreover, the Makernote tag is a tag meaning the storage location of the Makernote IFD.

When a data section (scene capture type data) corresponding to the scene capture type tag in the Exit SubIFD is "zero," it means "Normal," "1" means "landscape," "2" means "portrait," and "3" means "night scene." It should be noted that since data stored in the Exif SubIFD is standardized, anyone can understand the contents of this scene capture type data.

In the present embodiment, the MakerNote data includes shooting mode data. This shooting mode data represents different values corresponding to different modes set with the mode setting dial 2A. However, since the format of the MakerNote data varies from manufacturer to manufacturer, it is impossible to determine the details of the shooting mode data unless knowing the format of the MakerNote data.

FIG. 5 is a correspondence table that shows the correspondence between the settings of the mode setting dial 2A and the data. The scene capture type tag used in the Exif SubIFD is in conformity with the file format standard, so that scenes that can be specified are limited, and thus data specifying scenes such as "sunset scene" cannot be stored in a data section. On the other hand, the MakerNote data can be defined freely, so that data specifying the shooting mode of the mode setting dial 2A can be stored in a data section using a shooting mode tag, which is included in the MakerNote data.

After taking a picture with shooting conditions according to the setting of the mode setting dial 2A, the above-described digital still camera 2 creates an image file such as described above and saves the image file on the memory card 6. This image file contains the scene capture type data and the shooting mode data according to the mode setting dial 2A, which are stored in the Exif SubIFD area and the Makernote IFD area, respectively, as scene information appended to the image data.

Outline of Automatic Enhancement Function

When "portrait" pictures are printed, it is often desirable to improve the skin tones. Moreover, when "landscape" pictures are printed, it is often desirable that the blue color of the sky be emphasized and the green color of trees and plants be emphasized. Thus, the printer 4 of the present embodiment has an automatic enhancement function of analyzing the image file and automatically performing appropriate enhancement processing.

Figure 6:
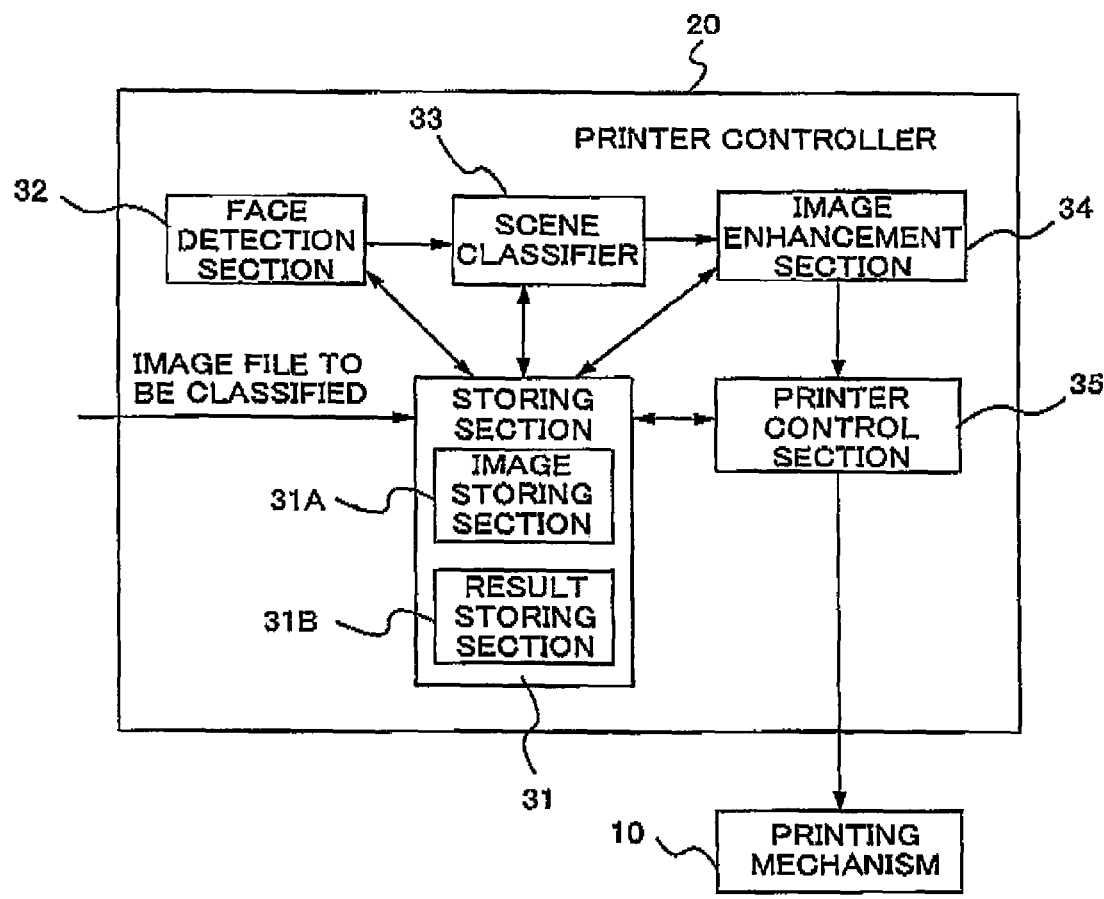
FIG. 6 is an explanatory diagram of the automatic enhancement function of a printer.

FIG. 6 is an explanatory diagram of the automatic enhancement function of the printer 4. The components of the printer controller 20 in the diagram are realized with software and hardware.

A storing section 31 is realized with a certain area of the memory 23 and the CPU 22. All or a part of the image file that has been read out from the memory card 6 is decoded in an image storing section 31A of the storing section 31. The results of the calculations performed by the components of the printer controller 20 are stored in a result storing section 31B of the storing section 31.

A face detection section 32 is realized with the CPU 22 and a face detection program stored in the memory 23. The face detection section 32 analyzes the image data stored in the image storing section 31A and classifies whether or not there is a human face. If the face detection section 32 classifies that there is a human face, the image to be classified is classified as belonging to "portrait" scenes. Since the face detection processing performed by the face detection section 32 is similar to processing that is already widespread, a detailed description thereof is omitted.

The face detection section 32 also calculates the probability (degree of certainty, evaluation value) that the image to be classified belongs to "portrait" scenes. This degree of certainty is calculated for example from the proportion of skin-colored pixels making up the image, the shape of the skin-colored image, the colors represented by the pixel data and the degree of closeness of the skin colors to stored colors. The classification result of the face detection section 32 is stored in the result storing section 31B.

The scene classifier 33 is realized with the CPU 22 and a scene classification program stored in the memory 23. The scene classifier 33 analyzes the image file stored in the image storing section 31A and classifies the scene of the image represented by the image data. After the face detection processing with the face detection section 32, the scene classifier 33 performs scene classification processing. As described later, the scene classifier 33 determines which of "landscape," "sunset scene," "night scene," "flower," and "autumnal," the image to be classified is classified as. Also the classification result of the scene classifier 33 and the information about the degree of certainty is stored in the result storage section 31B.

FIG. 7 is an explanatory diagram of the relationship between scenes of images and enhancement details.

An image enhancement section 34 is realized with the CPU 22 and an image enhancement program stored in the memory 23. The image enhancement section 34 enhances the image data in the image storing section 31A based on the classification result (result of classification performed by the face detection section 32 or the scene classifier 33) that has been stored in the result storing section 31B of the storing section 31 (which is explained further below). For example, when the classification result of the scene classifier 33 is "landscape," the image data is enhanced so that blue and green colors are emphasized. However, if the scene indicated by the supplemental data of the image file does not match the scene represented by the classification result, then the image enhancement section 34 enhances the image data in accordance with the confirmation result, after performing a predetermined confirmation process, which is explained later.

The printer control section 35 is realized with the CPU 22, the driving signal generation section 25, the control unit 24, and a printer control program stored in the memory 23. The printer control section 35 converts the enhanced image data into print data and lets the printing mechanism 10 print the image.

Scene classification Processing

Figure 8:
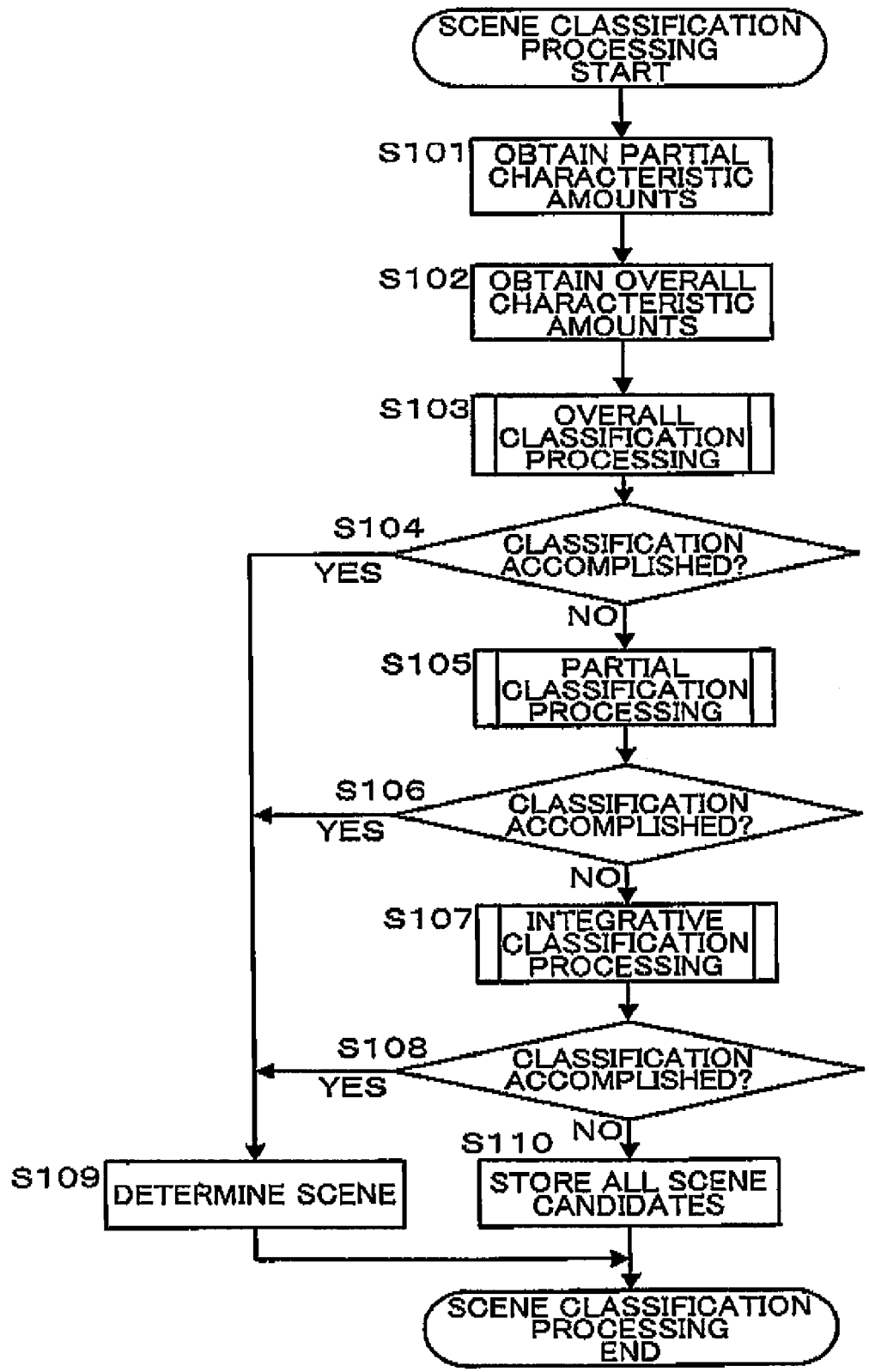
FIG. 8 is a flowchart of scene classification processing by a scene classifier.
Figure 9:
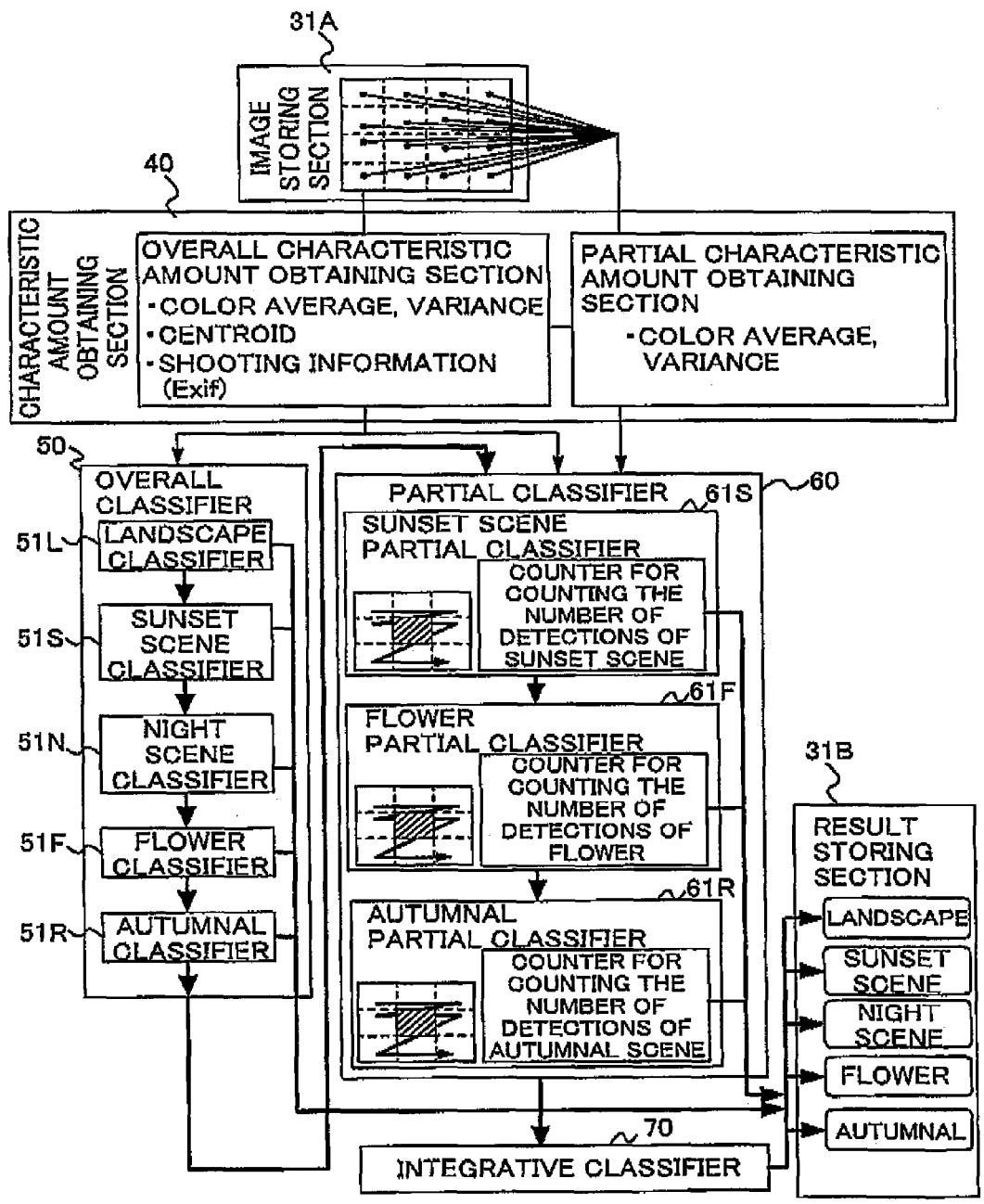
FIG. 9 is an explanatory diagram of functions of the scene classifier.

FIG. 8 is a flowchart of the scene classification processing performed by the scene classifier 33. FIG. 9 is an explanatory diagram of functions of the scene classifier 33. The components of the scene classifier 33 shown in the figure are realized with software and hardware. The scene classifier 33 includes a characteristic amount obtaining section 40, an overall classifier 50, a partial classifier 60 and an integrative classifier 70, as shown in FIG. 9.

First, a characteristic amount obtaining section 40 analyzes the image data decoded in the image storing section 31A of the storing section 31 and obtains partial characteristic amounts (S101). More specifically, the characteristic amount obtaining section 40 divides the image data into 8×8=64 blocks, calculates color average and variance of the each of the blocks, and obtains the calculated color averages and variances as partial characteristic amounts. It should be noted that every pixel here includes data about a tone value in the YCC color space, and an average value of Y, an average value of Cb, and an average value of Cr are calculated for each block, and also a variance of Y, a variance of Cb, and a variance of Cr are calculated for each block. That is to say, three color averages and three variances are calculated as partial characteristic amounts for each block. These color averages and variances indicate characteristics of the partial image in each block. It should be noted that it is also possible to calculate average values and variances in RGB color space.

Since the color averages and variances are calculated for each block, the characteristic amount obtaining section 40 decodes portions of the image data corresponding to the respective blocks in a block-by-block order without decoding all of the image data in the image storing section 31A. For this reason, the image storing section 31A does not have to be provided with a capacity as is needed for decoding the entire image file.

Next, the characteristic amount obtaining section 40 obtains overall characteristic amounts (S102). Specifically, the characteristic amount obtaining section 40 obtains color averages and variances, a centroid, and shooting information of the entire image data as overall characteristic amounts. It should be noted that these color averages and variances indicate characteristics of the entire image. The color averages and variances and the centroid of the entire image data are calculated using the partial characteristic amounts obtained before. For this reason, it is not necessary to decode the image data again when calculating the overall characteristic amounts, and thus the speed at which the overall characteristic amounts are calculated is increased. It is because the calculation speed is increased in this manner that the overall characteristic amounts are obtained after the partial characteristic amounts, although overall classification processing (described later) is performed before partial classification processing (described later). It should be noted that the shooting information is extracted from the shooting data in the image file. More specifically, information such as the aperture value, the shutter speed, and whether or not the flash is fired, is used as the overall characteristic amounts. However, not all of the shooting data in the image file is used as the overall characteristic amounts.

Next, an overall classifier 50 performs the overall classification processing (S103). The overall classification processing is processing for classifying (estimating) the scene of the image represented by the image data based on the overall characteristic amounts. A detailed description of the overall classification processing is provided later.

If the scene can be classified by the overall classification processing ("YES" in S104), the scene classifier 33 determines the scene by storing the classification result in the result storing section 31B of the storing section 31 (S109) and terminates the scene classification processing. That is to say, if the scene can be classified by the overall classification processing ("YES" in S104), the partial classification processing and integrative classification processing are omitted. Thus, the speed of the scene classification processing is increased.

If the scene cannot be classified by the overall classification processing ("NO" in S104), a partial classifier 60 then performs the partial classification processing (S105). The partial classification processing is processing for classifying the scene of the entire image represented by the image data based on the partial characteristic amounts. A detailed description of the partial classification processing is provided later.

If the scene can be classified by the partial classification processing ("YES" in S106), the scene classifier 33 determines the scene by storing the classification result in the result storing section 31B of the storing section 31 (S109) and terminates the scene classification processing. That is to say, if the scene can be classified by the partial classification processing ("YES" in S106), the integrative classification processing is omitted. Thus, the speed of the scene classification processing is increased.

If the scene cannot be classified by the partial classification processing ("NO" in S106), an integrative classifier 70 performs the integrative classification processing (107). A detailed description of the integrative classification processing is provided later.

If the scene can be classified by the integrative classification processing ("YES" in S108), the scene classifier 33 determines the scene by storing the classification result in the result storing section 311 of the storing section 31 (S109) and terminates the scene classification processing. On the other hand, if the scene cannot be classified by the integrative classification processing ("NO" in S108), the scene classifier 33 stores all scenes serving as candidates (scene candidates) in the result storing section 311 (S110). At this time, also the degree of certainty is stored in the result storing section 31B together with the scene candidates.

If the result of the scene classification processing (overall classification processing, partial classification processing, integrative classification processing) is "YES" in any of the steps S104, S106, and S108 in FIG. 8, then the printer controller 20 can classify one scene with a relatively high degree of certainty. If the result is "NO" in step S108, then the printer controller 20 can classify at least one scene (scene candidate) with a relatively low degree of certainty. It should be noted that if the result is "NO" in step S108, then there may be one scene candidate or there may be two or more scene candidates.

Overall Classification Processing

Figure 10:
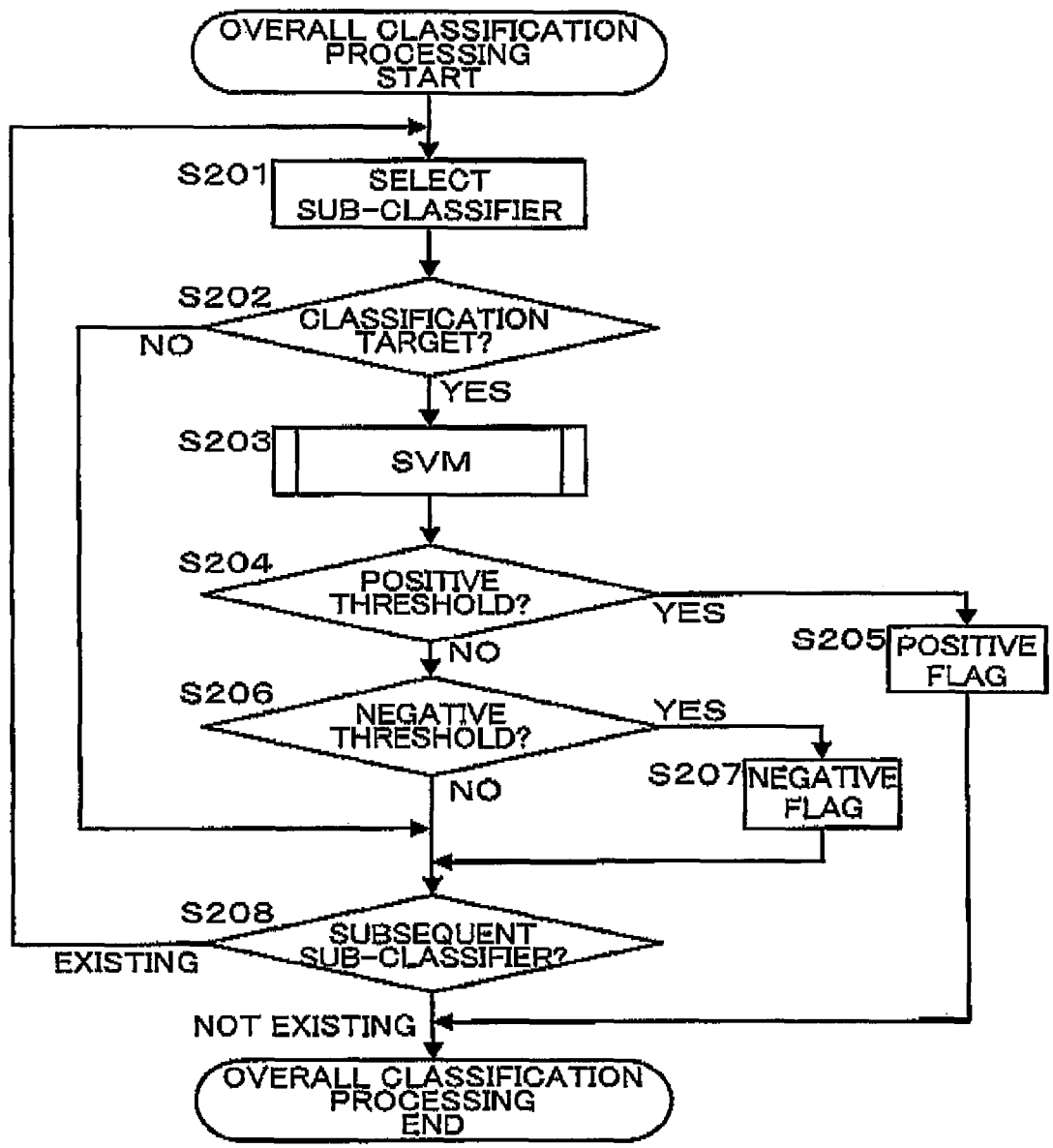
FIG. 10 is a flowchart of the overall classification processing.

FIG. 10 is a flowchart of overall classification processing. Here, the overall classification processing is described also with reference to FIG. 9.

First, the overall classifier 50 selects one sub-classifier 51 from a plurality of sub-classifiers 51 (S201). The overall classifier 50 is provided with five sub-classifiers 51 that classify whether or not the image serving as an object of classification (image to be classified) belongs to a specific scene. The five sub-classifiers 51 classify landscape scenes, sunset scenes, night scenes, flower scenes, and autumnal scenes, respectively. Here, the overall classifier 50 selects the sub-classifiers 51 in the order of landscape→sunset night→flower→autumnal scene. For this reason, at the start, the sub-classifier 51 (landscape classifier 51L) that classifies whether or not the image to be classified belongs to landscape scenes is selected.

Next, the overall classifier 50 references a classification target table and determines whether or not to classify the scene using the selected sub-classifier 51 (S202).

Figures 11, 12:
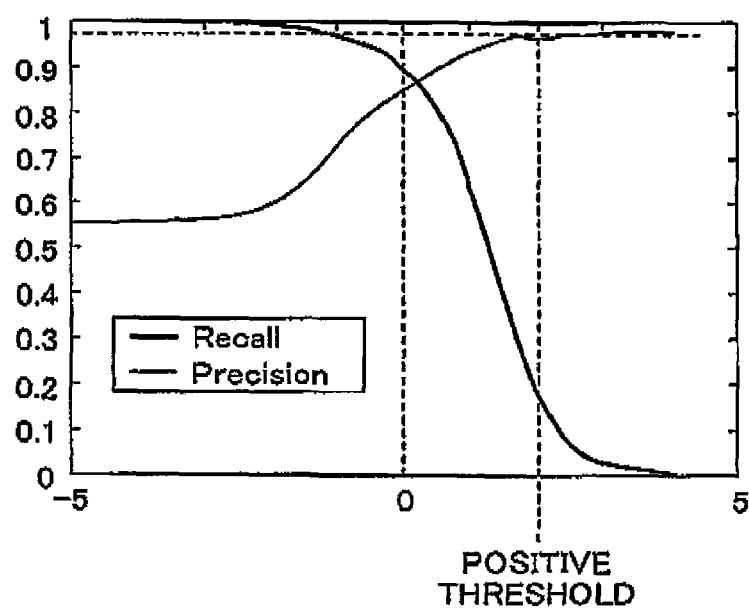
FIG. 11 is an explanatory diagram of a classification target table.
FIG. 12 is an explanatory diagram of the positive threshold in the overall classification processing.

FIG. 11 is an explanatory diagram of a classification target table. This classification target table is stored in the result storing section 31B of the storing section 31. At the first stage, all the fields in the classification target table are set to zero. In the process of S202, a "negative" field is referenced, and when this field is zero, the result is judged to be "YES," and when this field is 1, the result is judged to be "NO." Here, the overall classifier 50 references the "negative" field in the "landscape" column of the classification target table to find that this field is zero and thus the judgment result is "YES."

Next, the sub-classifier 51 calculates the value of a discrimination equation (evaluation value) based on the overall characteristic amounts (S203). The value of this discrimination equation relates to the probability (degree of certainty) that the image to be classified belongs to a specific scene (this is explained further below). The sub-classifiers 1 of the present embodiment employ a classification method using a support vector machine (SVM). A description of the support vector machine is provided later. If the image to be classified belongs to a specific scene, the discrimination equation of the sub-classifier 51 is likely to have a positive value. If the image to be classified does not belong to a specific scene, the discrimination equation of the sub-classifier 51 is likely to have a negative value. Moreover, the higher the degree of certainty that the image to be classified belongs to a specific scene is, the larger the value of the discrimination equation is. Accordingly, a large value of the discrimination equation indicates a high probability (degree of certainty) that the image to be classified belongs to a specific scene, and a small value of the discrimination equation indicates a low probability that the image to be classified belongs to a specific scene.

Therefore, the value (evaluation value) of the discrimination equation indicates the degree of certainty, i.e., the degree to which it is certain that the image to be classified belongs to a specific scene. It should be noted that the term "degree of certainty" as used in the following description may refer to the value itself of the discrimination equation or to a ratio of correct answers (described later) that can be obtained from the value of the discrimination equation. The value of the discrimination equation itself or the ratio of correct answers (described later) that can be obtained from the value of the discrimination equation is also an "evaluation value" (evaluation result) depending on the probability that the image to be classified belongs to a specific scene. In the course of the face detection described above, the face detection section 32 calculates the probability (evaluation value) that the image to be classified belongs to "portrait" scenes, and this evaluation value indicates the degree of certainty that the image to be classified belongs to a specific scene.

Next, the sub-classifier 51 determines whether or not the value of the discrimination equation is larger than a positive threshold (S204). If the value of the discrimination equation is larger than the positive threshold, the sub-classifier 51 judges that the image to be classified belongs to a specific scene.

FIG. 12 is an explanatory diagram of the positive threshold in the overall classification processing. In this diagram, the horizontal axis represents the positive threshold, and the vertical axis represents the probabilities of Recall and Precision. FIG. 13 is an explanatory diagram of Recall and Precision. If the value of the discrimination equation is equal to or more than the positive threshold, the classification result is taken to be positive, and if the value of the discrimination equation is less than the positive threshold, the classification result is taken to be negative.

Recall indicates the recall ratio or detection rate. Recall is the proportion of the number of images classified as belonging to a specific scene to the total number of images of that specific scene. In other words, Recall indicates the probability that, when the sub-classifier 51 is used to classify an image of a specific scene, the sub-classifier 51 makes a positive classification (the probability that the image of the specific scene is classified as belonging to that specific scene). For example, Recall indicates the probability that, when the landscape classifier 51L is used to classify a landscape image, the landscape classifier 51L classifies the image as belonging to landscape scenes.

Precision indicates the ratio of correct answers or accuracy rate. Precision is the proportion of the number of images of a specific scene to the total number of positively classified images. In other words, Precision indicates the probability that, when the sub-classifier 51 for classifying a specific scene positively classifies an image, the image to be classified is the specific scene. For example, Precision indicates the probability that, when the landscape classifier 51L classifies an image as belonging to landscape scenes, the classified image is actually a landscape image.

As can be seen from FIG. 12, the larger the positive threshold is, the greater Precision is. Thus, the larger the positive threshold is, the higher the probability that an image classified as belonging to, for example, landscape scenes is a landscape image is. That is to say, the larger the positive threshold is, the lower the probability of misclassification is.

On the other hand, the larger the positive threshold is, the smaller the Recall is. As a result, for example, even when a landscape image is classified by the landscape classifier 51L, it is difficult to correctly classify the image as belonging to landscape scenes. If the image to be classified can be classified as belonging to landscape scenes ("YES" in S204), classification with respect to the other scenes (such as sunset scenes) is no longer performed, and thus the speed of the overall classification processing is increased. Therefore, the larger the positive threshold is, the lower the speed of the overall classification processing is. Moreover, since the speed of the scene classification processing is increased by omitting the partial classification processing when scene classification can be accomplished by the overall classification processing (S104), the larger the positive threshold is, the lower the speed of the scene classification processing is.

That is to say, too small a positive threshold will result in a high probability of misclassification, and too large a positive threshold will result in a decreased processing speed. In the present embodiment, the positive threshold for landscapes is set to 1.72 in order to set the ratio of correct answers (Precision) to 97.5%.

If the value of the discrimination equation is larger than the positive threshold ("YES" in S204), then the sub-classifier 51 determines that the image to be classified belongs to a specific scene, and sets a positive flag (S205). "Set a positive flag" refers to setting a "positive" field in FIG. 11 to 1. In this case, the overall classifier 50 terminates the overall classification processing without performing classification by the subsequent sub-classifiers 51. For example, if an image can be classified as a landscape image, the overall classifier 50 terminates the overall classification processing without performing classification with respect to sunset scenes and so on. In this cases the speed of the overall classification processing can be increased because classification by the subsequent sub-classifiers 51 is omitted.

If the value of the discrimination equation is not larger than the positive threshold ("NO" in S204), then the sub-classifier 51 cannot judge the image to be classified as belonging to a specific scene, and performs the subsequent process of S206.

Then, the sub-classifier 51 compares the value of the discrimination equation with a negative threshold (S206). Based on this comparison, the sub-classifier 51 may determine that the image to be classified does not belong to a predetermined scene. Such a determination is made in two ways. First, if the value of the discrimination equation of the sub-classifier 51 with respect to a certain specific scene is smaller than a first negative threshold, it is judged that the image to be classified does not belong to that specific scene. For example, if the value of the discrimination equation of the landscape classifier 51L is smaller than the first negative threshold, it is judged that the image to be classified does not belong to landscape scenes. Second, if the value of the discrimination equation of the sub-classifier 51 with respect to a certain specific scene is larger than a second negative threshold then it is judged that the image to be determined does not belong to a scene different from that specific scene. For example, if the value of the discrimination equation of the landscape classifier 51L is larger than the second negative threshold, then it is determined that the image to be classified does not belong to night scenes.

Figure 14:
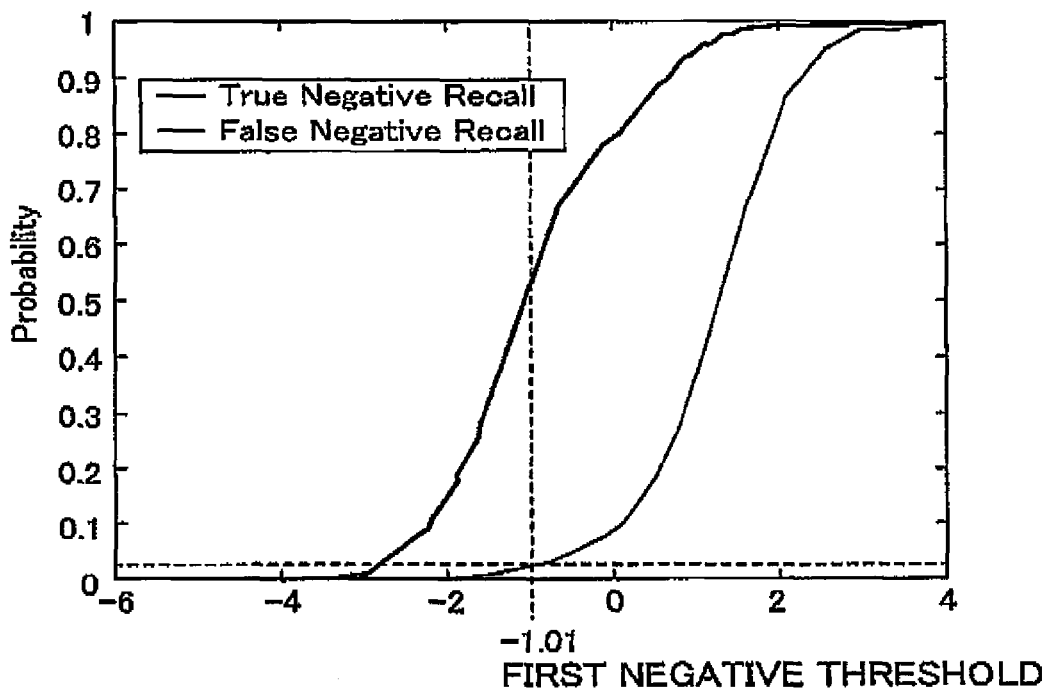
FIG. 14 is an explanatory diagram of a first negative threshold.

FIG. 14 is an explanatory diagram of a first negative threshold. In this diagram, the horizontal axis represents the first negative threshold, and the vertical axis represents the probability. The bold curve in the graph represents True Negative Recall and indicates the probability that an image that is not a landscape image is correctly classified as not being a landscape image. The thin curve in the graph represents False Negative Recall and indicates the probability that a landscape image is misclassified as not being a landscape image.

As can be seen from FIG. 14, the smaller the first negative threshold is, the smaller False Negative Recall is. Thus, the smaller the first negative threshold is, the lower the probability that an image classified as not belonging to, for example, landscape scenes is actually a landscape image becomes. In other words, the probability of misclassification decreases.

On the other hand, the smaller the first negative threshold is, the smaller True Negative Recall is as well. As a result, an image that is not a landscape image is less likely to be classified as not being a landscape image. On the other hand, if the image to be classified can be classified as not being a specific scene, processing by a sub-partial classifier 61 with respect to that specific scene is omitted during the partial classification processing, thereby increasing the speed of the scene classification processing (described later, S302 in FIG. 17). Therefore, the smaller the first negative threshold is, the lower the speed of the scene classification processing is.

That is to say, too large a first negative threshold will result in a high probability of misclassification, and too small a first negative threshold will result in a decreased processing speed. In the present embodiment, the first negative threshold is set to −1.01 in order to set False Negative Recall to 2.5%.

When the probability that a certain image belongs to landscape scenes is high, the probability that this image belongs to night scenes is inevitably low. Thus, when the value of the discrimination equation of the landscape classifier 51L is large, it may be possible to classify the image as not being a night scene. The second negative threshold is provided in order to perform such classification.

Figure 15:
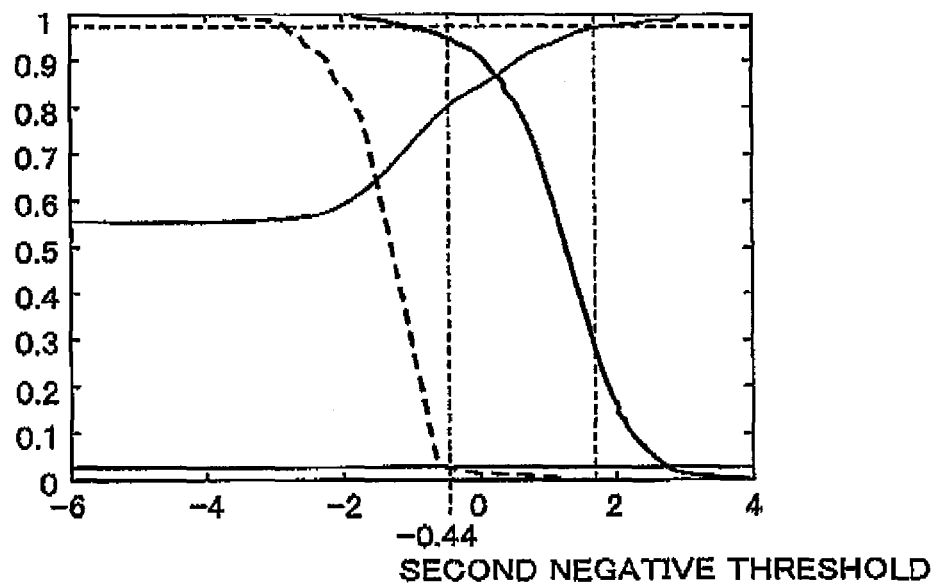
FIG. 15 is an explanatory diagram of a second negative threshold.

FIG. 15 is an explanatory diagram of a second negative threshold. In this diagram, the horizontal axis represents the value of the discrimination equation with respect to landscapes, and the vertical axis represents the probability. This diagram shows, in addition to the graphs of Recall and Precision shown in FIG. 12, a graph of Recall with respect to night scenes, which is drawn by a dotted line. When looking at this graph drawn by the dotted line, it is found that when the value of the discrimination equation with respect to landscapes is larger than −0.44, the probability that the image to be classified is a night scene image is 2.5%. In other words, even if the image to be classified is classified as not being a night scene image when the value of the discrimination equation with respect to landscapes is larger than −0.44, the probability of misclassification is no more than 2.5% In the present embodiment, the second negative threshold is therefore set to −0.44.

If the value of the discrimination equation is smaller than the first negative threshold or it the value of the discrimination equation is larger than the second negative threshold ("YES" in S206), the sub-classifier 51 judges that the image to be classified does not belong to a predetermined scene, and sets a negative flag (S207). "Set a negative flag" refers to setting a "negative" field in FIG. 11 to 1. For example, if it is judged that the image to be classified does not belong to landscape scenes based on the first negative threshold, the "negative" field in the "landscape" column is set to 1. Moreover, if it is judged that the image to be classified does not belong to night scenes based on the second negative threshold, the "negative" field in the "night scene" column is set to 1.

Figure 16A:
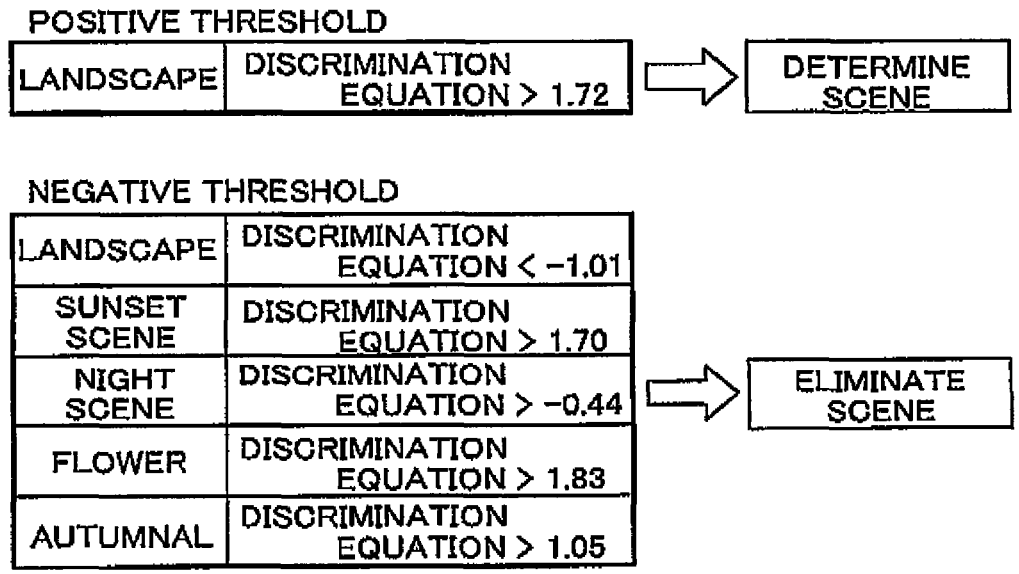
FIG. 16A is an explanatory diagram of thresholds in a landscape classifier.

FIG. 16A is an explanatory diagram of the thresholds in the landscape classifier 51L described above. In the landscape classifier 51L, a positive threshold and negative thresholds are set in advance. The positive threshold is set to 1.72. The negative thresholds include a first negative threshold and second negative thresholds. The first negative threshold is set to −1.01. The second negative thresholds are set for scenes other than landscapes to respective values.

Figure 16B:
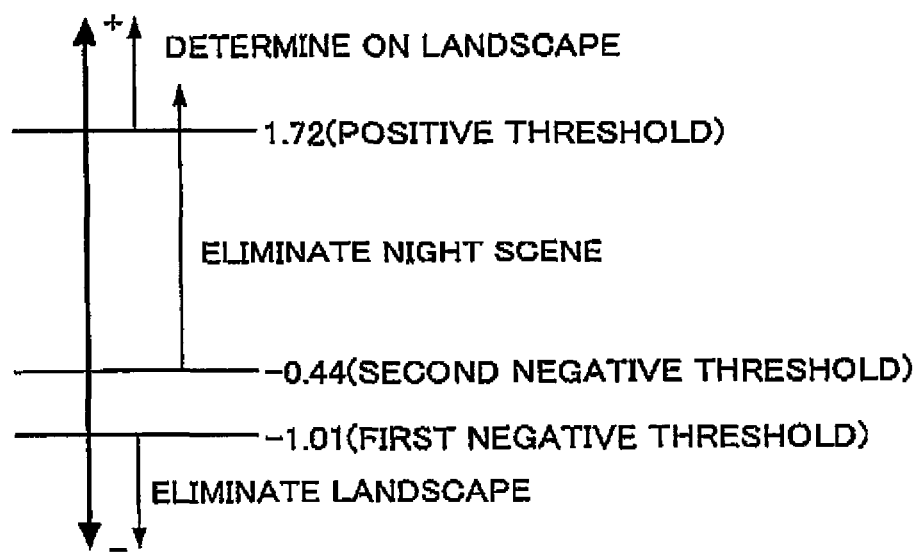
FIG. 16B is an explanatory diagram of an outline of processing by the landscape classifier.

FIG. 16B is an explanatory diagram of an outline of the processing by the landscape classifier 51L described above. Here, for the sake of simplicity of description, the second negative thresholds are described with respect to night scenes alone. If the value of the discrimination equation is larger than 1.72 ("YES" in S204), the landscape classifier 51L judges that the image to be classified belongs to landscape scenes. If the value of the discrimination equation is not larger than 1.72 ("NO" in S204) but larger than −0.44 ("YES" in S206), the landscape classifier 51L judges that the image to be classified does not belong to night scenes. If the value of the discrimination equation is smaller than −1.01 ("YES" in S206), the landscape classifier 51L judges that the image to be classified does not belong to landscape scenes. It should be noted that the landscape classifier 51L also judges with respect to sunset scenes and autumnal whether the image to be classified does not belong to these scenes based on the second negative thresholds. However, since the second negative threshold with respect to flower scenes is larger than the positive threshold, the landscape classifier 51L will never judge that the image to be classified does not belong to flower scenes.

If "NO" is established in S202, and "NO" is established in S206, or if the process of S207 is finished, the overall classifier 50 determines whether or not there is a subsequent sub-classifier 51 (S208). Here, the processing by the landscape classifier 51L has been finished, so that the overall classifier 50 determines in S208 that there is a subsequent sub-classifier 51 (sunset scene classifier 51S).

Then, if the process of S205 is finished (if it is judged that the image to be classified belongs to a specific scene) or it it is judged in S208 that there is no subsequent sub-classifier 51 (if it cannot be judged that the image to be classified belongs to a specific scene), the overall classifier 50 terminates the overall classification processing.

As already described above, when the overall classification processing is terminated, the scene classifier 33 determines whether or not scene classification could be accomplished by the overall classification processing (S104 in FIG. 8). At this time, the scene classifier 33 references the classification target table shown in FIG. 11 and judges whether or riot there is a "1" among the "positive" fields.

If scene classification could be accomplished by the overall classification processing ("YES" in S104), the partial classification processing and the integrative classification processing are omitted. Thus, the speed of the scene classification processing is increased.

Partial Classification Processing

Figure 17:
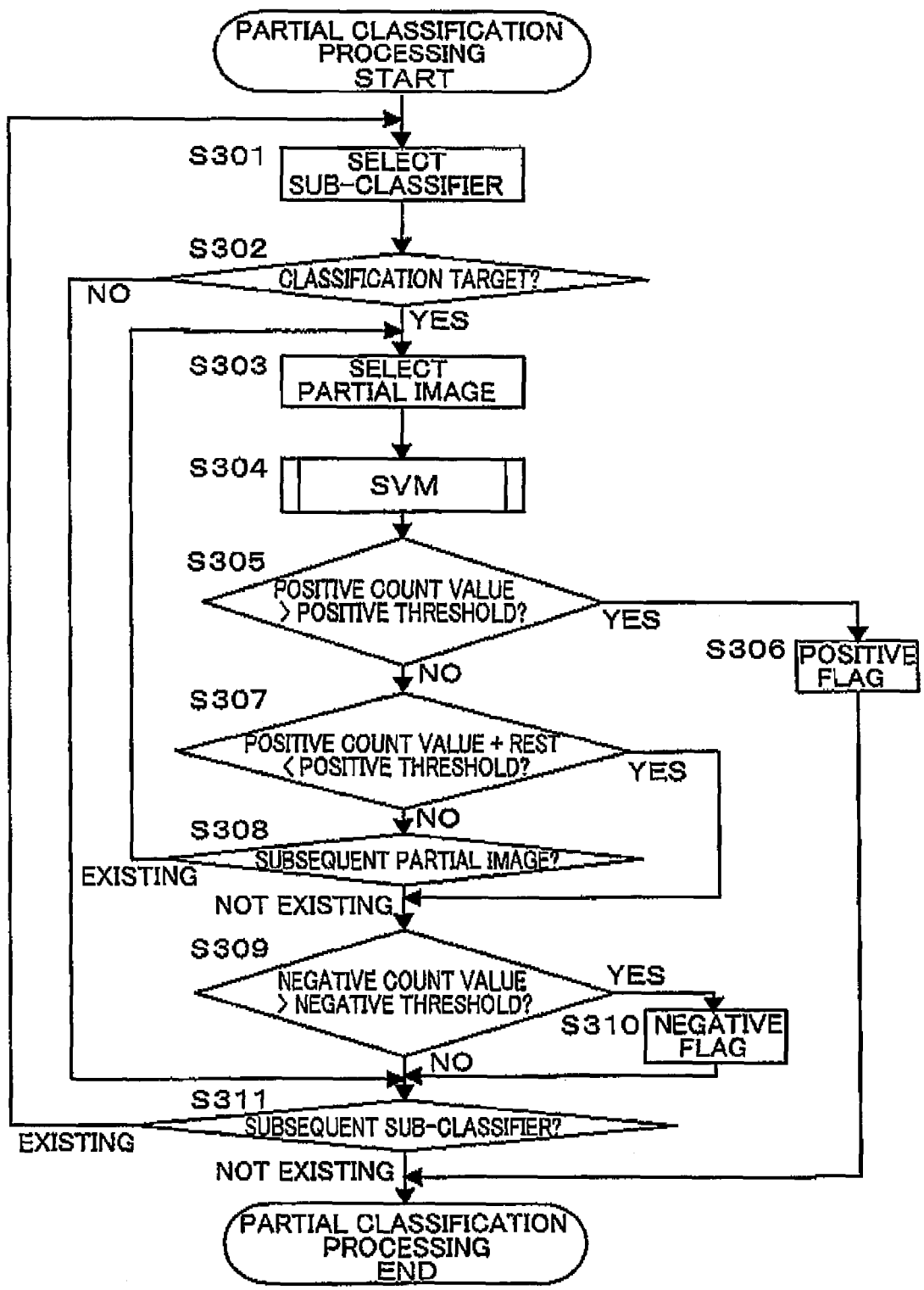
FIG. 17 is a flowchart of the partial classification process.

FIG. 17 is a flowchart of partial classification processing. The partial classification processing is performed if a scene cannot be classified by the overall classification processing ("NO" in S104 in FIG. 8). As described in the following, the partial classification processing is processing for classifying the scene of the entire image by individually classifying the scenes of partial images into which the image to be classified is divided. Here, the partial classification processing is described also with reference to FIG. 9.

First, the partial classifier 60 selects one sub-partial classifier 61 from a plurality of sub-partial classifiers 61 (S301). The partial classifier 60 is provided with three sub-partial classifiers 61. Each of the sub-partial classifiers 61 classifies whether or not the 8×8=64 blocks of partial images into which the image to be classified is divided belong to a specific scene. The three sub-partial classifiers 61 here classify sunset scenes, flower scenes, and autumnal scenes, respectively. The partial classifier 60 selects the sub-partial classifiers 61 in the order of sunset→flower→autumnal scene. Thus, at the start, the sub-partial classifier 61 (sunset scene partial classifier 61S) that classifies whether or not the partial images belong to a sunset scene is selected.

Next, the partial classifier 60 references the classification target table (FIG. 11) and determines whether or not scene classification is to be performed using the selected sub-partial classifier 61 (S302). Here, the partial classifier 60 references the "negative" field in the "sunset scene" column in the classification target table, and judges "YES" when there is a zero, and "NO" when there is a 1. It should be noted that if, during the overall classification processing, the sunset scene classifier 51S has set a negative flag based on the first negative threshold or another sub-classifier 51 has set a negative flag based on the second negative threshold, the judgment is "NO" in this step S302. If the judgment is "NO", the partial classification processing with respect to sunset scenes is omitted, so that the speed of the partial classification processing is increased. However, for the sake of explanation, it is assumed that the judgment here is "YES."

Next, the sub-partial classifier 61 selects one partial image from the 8×8=64 blocks of partial images into which the image to be classified is divided (S303).

FIG. 18 is an explanatory diagram of the order in which the partial images are selected by the sunset scene partial classifier 61S. If the scene of the entire image is classified based on partial images, it is preferable that the partial images used for classification are portions in which the photographic subject is present. For this reason, in the present embodiment, several thousand sample sunset scene images were prepared, each of the sunset scene images was divided into 8×8=64 blocks, blocks containing a partial sunset scene image (partial image of the sun and sky of a sunset scene) were extracted, and based on the location of the extracted blocks, the probability that a partial sunset scene image is present in each block was calculated. In the present embodiment, partial images are selected in descending order of the presence probability of the blocks. It should be noted that information about the selection sequence shown in the diagram is stored in the memory 23 as a part of the program.

In the case of a sunset scene image, the sky of the sunset scene often extends from around the center portion to the upper half portion of the image, so that the presence probability increases in blocks located in a region from around the center portion to the upper half portion. In addition, in the case of a sunset scene image, the lower ⅓ portion of the image often becomes dark due to backlight and it is usually impossible to determine based on a single partial image whether the image is a sunset scene or a night scene, so that the presence probability decreases in blocks located in the lower ⅓ portion. In the case of a flower image, the flower is usually positioned around the center portion of the image, so that the probability that a flower portion image is present around the center portion is high.

Next, the sub-partial classifier 61 judges, based on the partial characteristic amounts of the partial image that has been selected, whether or not the selected partial image belongs to a specific scene (S304). The sub-partial classifiers 61 employ a discrimination method using a support vector machine (SVM), as is the case with the sub-classifiers 51 of the overall classifier 50. A description of the support vector machine is provided later. If the discrimination equation has a positive value, it is judged that the partial image belongs to the specific scene, and the sub-partial classifier 61 increments a positive count value. If the discrimination equation has a negative value, it is judged that the partial image does not belong to the specific scene, and the sub-partial classifier 61 increments a negative count value.

Next, the subpartial classifier 61 judges whether or not the positive count value is larger than a positive threshold (S305). The positive count value indicates the number of partial images that have been judged to belong to the specific scene. If the positive count value is larger than the positive threshold ("YES" in S305), the sub-partial classifier 61 judges that the image to be classified belongs to the specific scene, and sets a positive flag (S306). In this case, the partial classifier 60 terminates the partial classification processing without performing classification by the subsequent sub-partial classifiers 61. For example, when the image to be classified can be classified as a sunset scene image, the partial classifier 60 terminates the partial classification processing without performing classification with respect to flower and autumnal scenes. In this case, the speed of the partial classification processing can be increased because classification by the subsequent sub-partial classifiers 61 is omitted.

If the positive count value is not larger than the positive threshold ("NO" in S305), the sub-partial classifier 61 cannot determine that the image to be classified belongs to the specific scene, and performs the processing of the subsequent step S307.

If the sum of the positive count value and the number of remaining partial images is smaller than the positive threshold ("YES" in S307), the sub-partial classifier 61 proceeds to the process of S309. If the sum of the positive count value and the number of remaining partial images is smaller than the positive threshold, it is impossible for the positive count value to become larger than the positive threshold even if the positive count value is incremented by all of the remaining partial images, so that classification with the support vector machine for the remaining partial images is omitted by advancing the process to S309. As a result, the speed of the partial classification processing can be increased.

If the sub-partial classifier 61 judges "NO" in S307, the sub-partial classifier 61 judges whether or not there is a subsequent partial image (S308). In the present embodiment, not all of the 64 partial images into which the image to be classified is divided are selected sequentially. Only the top-ten partial images outlined by bold lines in FIG. 18 are selected sequentially. For this reason, when classification of the tenth partial image is finished, the sub-partial classifier 61 judges in S308 that there is no subsequent partial image. ("The number of partial images remaining" in S307 is also determined with consideration to this aspect.)

Figure 19:
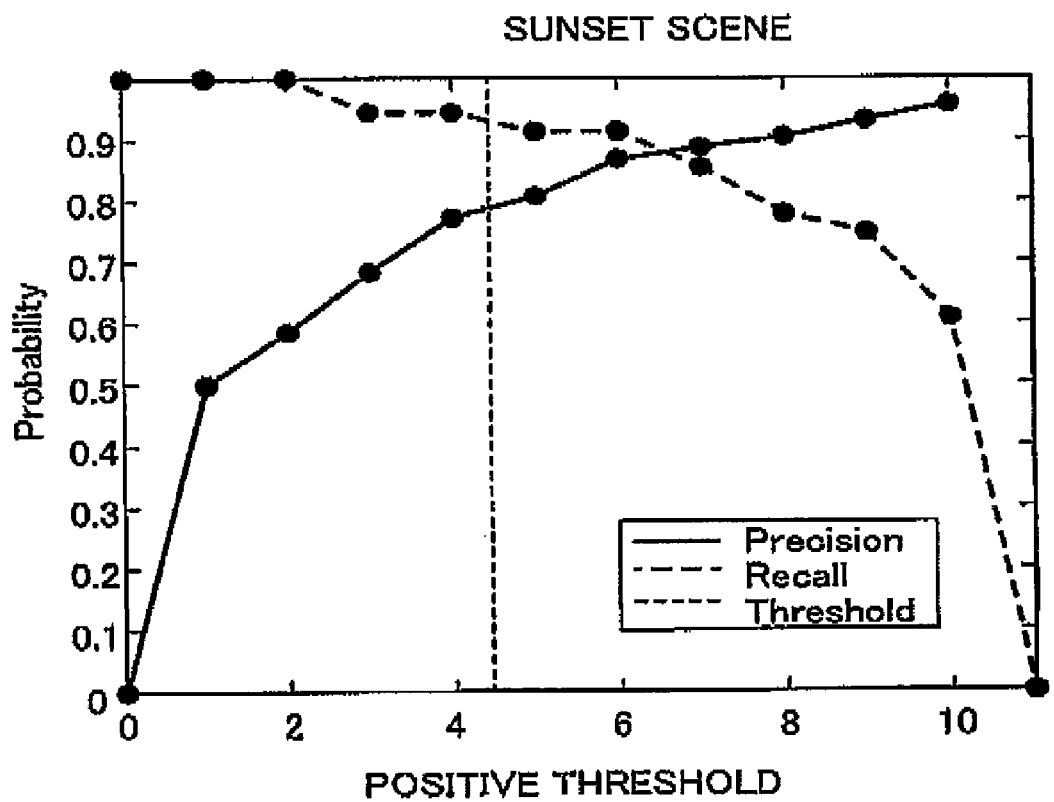
FIG. 19 shows graphs of Recall and Precision when a sunset scene image is classified using only the top-ten partial images.

FIG. 19 shows graphs of Recall and Precision when a sunset scene image is classified using only the top-ten partial images. When the positive threshold is set as shown in this diagram, the ratio of correct answers (Precision) can be set to about 80% and the recall ratio (Recall) can be set to about 90%, so that classification can be performed with high precision.

In the present embodiment, classification of the sunset scene image is performed based on only ten partial images. Accordingly, in the present embodiment, the speed of the partial classification processing can be made higher than in the case of performing classification of the sunset scene image using all of the 64 partial images.

Moreover, in the present embodiment, classification of the sunset scene image is performed using the top-ten partial images with a high presence probability of containing a partial sunset scene image. Accordingly, in the present embodiment, both Recall and Precision can be set to higher levels than in the case of performing classification of the sunset scene image using ten partial images that have been extracted regardless of the presence probability.

Furthermore, in the present embodiment, the partial images are selected in descending order of the presence probability of containing a partial sunset scene image. As a result, there is a greater likelihood of judging "YES" at an early stage in S305. Accordingly, the speed of the partial classification processing can be higher than in the case of selecting partial images in the order regardless of whether the presence probability is high or low.

If the judgment is "YES" in S307 or if it is judged in S308 that there is no subsequent partial image, then the sub-partial classifier 61 judges whether or not the negative count value is larger than a negative threshold (S309). This negative threshold has substantially the same function as the negative threshold (S206 in FIG. 10) in the above-described overall classification processing, and thus a detailed description thereof is omitted. If the judgment is "YES" in S309, a negative flag is set as in the case of S207 in FIG. 10.

If the judgment is "NO" in S302, if it is "NO" in S309, or if the process of S310 is finished, the partial classifier 60 judges whether or not there is a subsequent sub-partial classifier 61 (S311). If the processing by the sunset scene partial classifier 61S has been finished, there are remaining sub-partial classifiers 61, i.e., the flower partial classifier 61F and the autumnal partial classifier 61R, so that the partial classifier 60 judges in S311 that there is a subsequent sub-partial classifier 61.

Then, if the process of S306 is finished (it it is judged that the image to be classified belongs to a specific scene) or if it is judged in S311 that there is no subsequent sub-partial classifier 61 (if it cannot be judged that the image to be classified belongs to a specific scene), the partial classifier 60 terminates the partial classification processing.

As already described above, when the partial classification processing is terminated, the scene classifier 33 judges whether or not scene classification could be accomplished by the partial classification processing (S106 in FIG. 8). At this time, the scene classifier 33 references the classification target table shown in FIG. 11 and judges whether or not there is a "1" among the "positive" fields.

If the scene could be classified by partial classification processing ("YES" in S106), then the integrative classification processing is omitted. Thus, the speed of the scene classification processing is increased.

Support Vector Machine

Before describing the integrative classification processing, the support vector machine (SW) used by the sub-classifiers 51 in the overall classification processing and the sub-partial classifiers 61 in the partial classification processing is described.

Figure 20A:
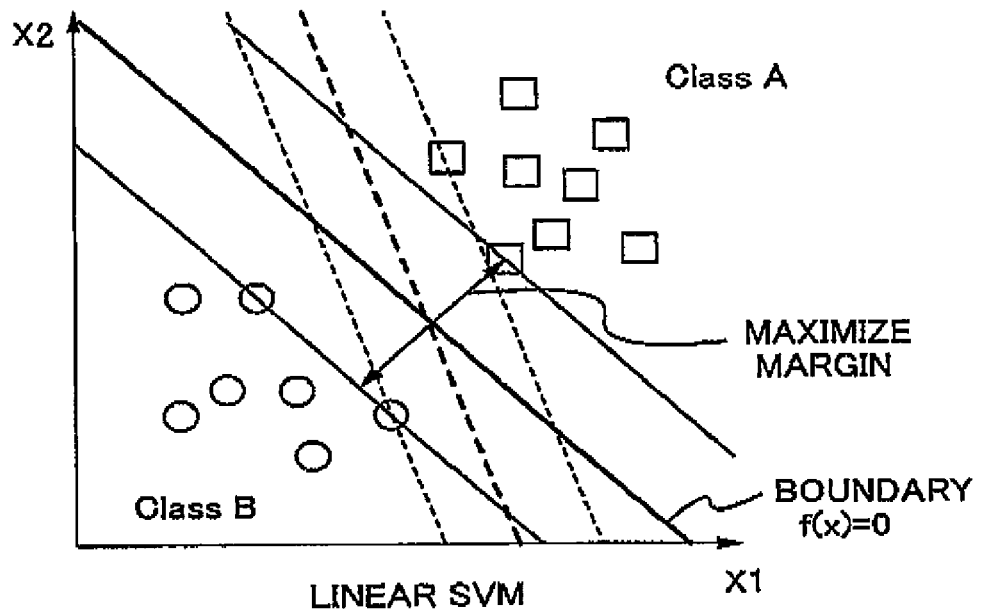
FIG. 20A is an explanatory diagram of discrimination using a linear support vector machine.

FIG. 20A is an explanatory diagram of discrimination using a linear support vector machine. Here, learning samples are shown in a two-dimensional space defined by two characteristic amounts x1 and x2. The learning samples are divided into two classes A and B. In the diagram, the samples belonging to the class A are represented by circles, and the samples belonging to the class B are represented by squares.

As a result of learning using the learning samples, a boundary that divides the two-dimensional space into two portions is defined. The boundary is defined as <w·x>+b=0 (where x=(x1, x2), w represents a weight vector, and <w·x> represents the inner product of w and x). However, the boundary is defined as a result of learning using the learning samples so as to maximize the margin. That is to say, in this diagram, the boundary is not the hold dotted line but the bold solid line.

Discrimination is performed using the discrimination equation f(x)=<w·x>+b. If a given input x (separate from the learning samples) satisfies f(x)>0, it is discriminated as belonging to the class A, and if f(x)<0, it is discriminated as belonging to the class B.

Here, discrimination using the two-dimensional space is described, however there is no limitation to this (i.e., more than two characteristic amounts may be used) In this case, the boundary is defined as a hyperplane.

There are cases where separation between the two classes cannot be achieved by using a linear function. In such cases, when discrimination is performed with a linear support vector machine, the precision of the discrimination result decreases. To address this problem, the characteristic amounts in the input space are nonlinearly transformed, or in other words, nonlinearly mapped from the input space into a certain characteristics space, and thus separation in the characteristics space can be achieved by using a linear function. Nonlinear support vector machines use this method.

Figure 20B:
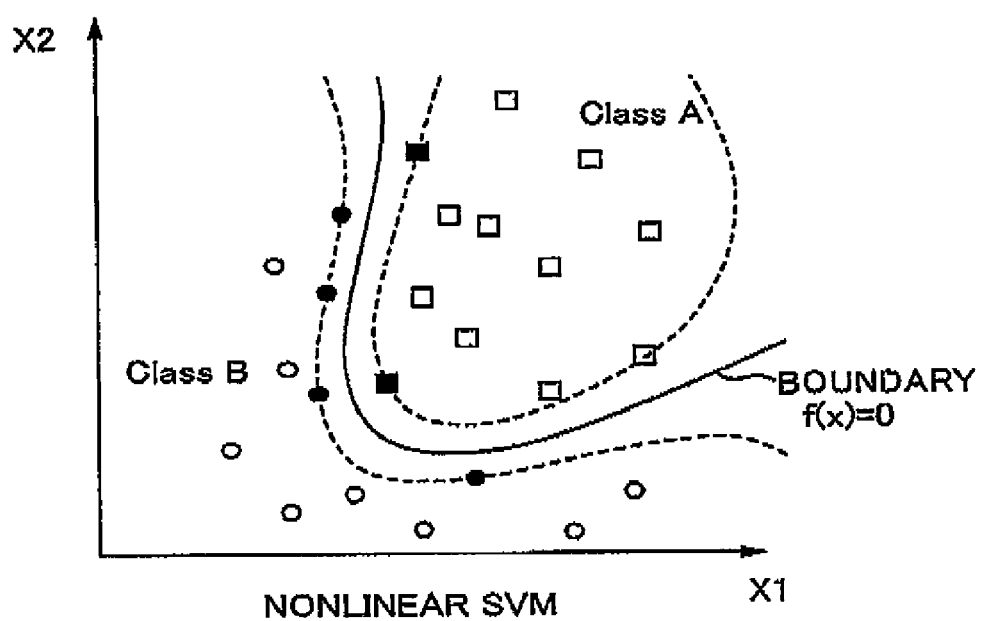
FIG. 20B is an explanatory diagram of discrimination using a kernel function.

FIG. 20B is an explanatory diagram of discrimination using a kernel function. Here, learning samples are shown in a two-dimensional space defined by two characteristic amounts x1 and x2. If a characteristics space as shown in FIG. 20A is obtained by nonlinear mapping from the input space shown in FIG. 20B, then separation between the two classes can be achieved by using a linear function. An inverse mapping of the boundary in the characteristics space is the boundary shown in FIG. 20B, where the boundary is defined so as to maximize the margin in this characteristics space. As a result, the boundary is nonlinear as shown in FIG. 20B.

The present embodiment uses a Gauss kernel function, so that the discrimination equation f(x) is as follows (where M represents the number of characteristic amounts, N represents the number of learning samples (or the number of learning samples that contribute to the boundary), $w_i$ represents a weight factor, $y_j$ represents the characteristic amount of the learning samples, and $x_j$ represents the characteristic amount of an input x.)

$$f(x) = \sum_i^N w_i \exp\left(-\sum_j^M \frac{(x_j - y_j)^2}{2\sigma^2}\right) \quad \text{Equation 1}$$

If a given input x (separate from the learning samples) satisfies f(x)>0, it is discriminated as belonging to the class A, and if f(x)<0, it is discriminated as belonging to the class B. Moreover, the larger the value of the discrimination equation f(x) is, the higher the probability that the input x (which is separate from the learning samples) belongs to the class A is. Conversely, the smaller the value of the discrimination equation f(x) is, the lower the probability that the input x (which is separate from the learning samples) belongs to the class A is. The sub-classifiers 51 in the overall classification processing and the sub-partial classifiers 61 in the partial classification processing, which are described above, utilize the value of the discrimination equation f(x) of the above-described support vector machine.

It should be noted that evaluation samples are prepared separately from the learning samples. The above-described graphs of Recall and Precision are based on the classification result with respect to the evaluation samples.

Integrative Classification Processing

In the above-described overall classification processing and partial classification processing, the positive thresholds in the sub-classifiers 51 and the sub-partial classifiers 61 are set to relatively high values to set Precision (ratio of correct answers) to a rather high level. The reason for this is that when, for example, the ratio of correct answers of the landscape classifier 51L of the overall classifier is set to a low level, a problem occurs in that the landscape classifier 51L may misclassify an autumnal image as a landscape image and terminate the overall classification processing before classification by the autumnal classifier 51R is performed. In the present embodiment, Precision (the ratio of correct answers) is set to a rather high level, and thus an image belonging to a specific scene is classified by the sub-classifier 51 (or the sub-partial classifier 61) with respect to that specific scene (for example, an autumnal image is classified by the autumnal classifier 51R (or the autumnal partial classifier 61R)).

However, when Precision (the ratio of correct answers) of the overall classification processing and the partial classification processing is set to a rather high level, the possibility that scene classification cannot be accomplished by the overall classification processing and the partial classification processing increases. To address this problem, in the present embodiment, when scene classification could not be accomplished by the overall classification processing and the partial classification processing, the integrative classification processing described in the following is performed.

Figure 21:
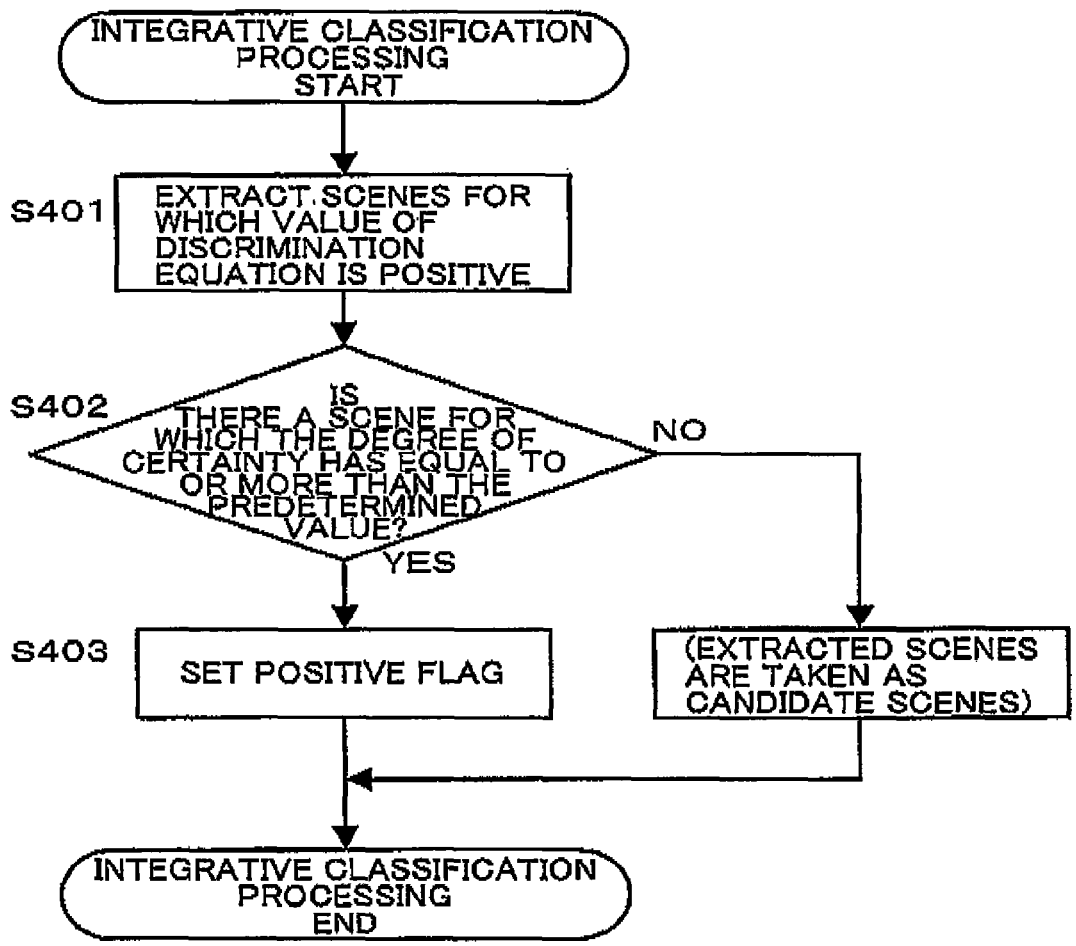
FIG. 21 is a flowchart of the integrative classification processing.

FIG. 21 is a flowchart of integrative classification processing. As described in the following, the integrative classification processing selects a scene with the highest degree of certainty and having equal to or more than a predetermined degree of certainty (for example equal to or more than 90%) based on the value of the discrimination equation of the sub-classifiers 51 in the overall classification processing.

First, the integrative classifier 70 extracts, based on the values of the discrimination equations of the five sub-classifiers 51, a scene for which the value of the discrimination equation is positive (S401). At this time, the value of the discrimination equation calculated by the sub-classifiers 51 during the overall classification processing is used.

Next, the integrative classifier 70 judges whether or not there is a scene for which the degree of certainty has equal to or more than a predetermined value (S402). Here, the degree of certainty indicates the probability that the image to be classified belongs to certain scenes and is determined from the value of the discrimination equation. More specifically, the integrative classifier 70 is provided with a table indicating the relation between values of the discrimination equation and Precision. The Precision corresponding to the value of the discrimination equation is derived from this table and this value of Precision is taken as the degree of certainty. It should be noted that the predetermined value is set for example to 90%, which is a value that is lower than Precision (97.5%), which is set by the positive thresholds of the overall classifier and the partial classifiers. However, the degree of certainty does not have to be Precision and it is also possible to use the value of the discrimination equation as the degree of certainty.

When there is a scene for which the degree of certainty has at least the predetermined value ("YES" in S402), then a positive flag is set in the column of that scene (S403), and the integrative classification processing is terminated. It should be noted that when a scene with a degree of certainty of at least 90% is extracted, then a plurality of scenes will not be extracted. This is so because if the degree of certainty of a given scene is high, then the degree of certainty of other scenes is inevitably low.

On the other hand, when there is no scene for which the degree of certainty has at least the predetermined value ("NO" in S402), the integrative classification processing is terminated without setting a positive flag. Thus, there is still no scene for which 1 is set in the "positive" fields of the classification target table shown in FIG. 11. That is to say, the scene to which the image to be classified belongs could not be classified.

As already described above, when the integrative classification processing is terminated, the scene classifier 33 judges whether or not scene classification could be accomplished by the integrative classification processing (S108 in FIG. 8). At this time, the scene classifier 33 references the classification target table shown in FIG. 11 and judges whether or not there is a "1" among the "positive" fields. If the judgment is "YES" in S402, then also the judgment in S108 is "YES". If the judgment is "NO" in S402, then also the judgment in S108 is "NO".

In the present embodiment, it the judgment is "NO" in S108 of FIG. 8, that is, if the judgment is "NO" in S402 in FIG. 21, then all scenes extracted in S401 are stored as scene candidates in the result storage sections 31B.

First Embodiment

Overview

As described above, the user can set a shooting mode using the mode setting dial 2A. Then, the digital still camera 2 determines shooting conditions (exposure time, ISO sensitivity, etc.) based on, for example, the set shooting mode and the result of photometry when taking a picture and photographs the photographic subject under the determined shooting conditions. After taking the picture, the digital still camera 2 stores shooting data indicating the shooting conditions when the picture was taken together with image data in the memory card 6 as an image file.

There are instances where the user forgets to set the shooting mode and thus a picture is taken while a shooting mode unsuitable for the shooting conditions remains set. For example, a daytime landscape scene may be photographed with the night scene mode still being set. As a result, in this case, although the image data in the image file is an image of a daytime landscape scene, data indicating the night scene mode is stored in the shooting data (for example, the scene capture type data shown in FIG. 5 is set to "3"). In this case, when the image data is enhanced based on improper scene capture type data, printing may be carried out with an image quality that is undesirable for the user.

On the other hand, sometimes a print with the image quality desired by the user is not obtained even if the image data is enhanced based on the result of the classification processing (face detection processing and scene classification processing). For example, it a misclassification occurs during the classification processing, a print with the image quality desired by the user may not be obtained. Moreover, also when the user overrides the set shooting mode in order to attain a special effect, and the image data is enhanced based on the classification result by the printer, printing cannot be performed as intended by the user.

Accordingly, an order sheet prompting the user to make a confirmation is printed in the present embodiment. More specifically, as explained further below, when a mismatch between the classification processing result and the scene indicated by the scene information (scene capture type data or shooting mode data) of the supplemental data of the image file exists, then an order sheet is printed, the user fills in a mark on the order sheet with a pencil, the scanner section reads in the order sheet, the printer 4 performs enhancement processing in accordance with the reading result and carries out the printing.

Explanation of Order Sheet

Figure 22:
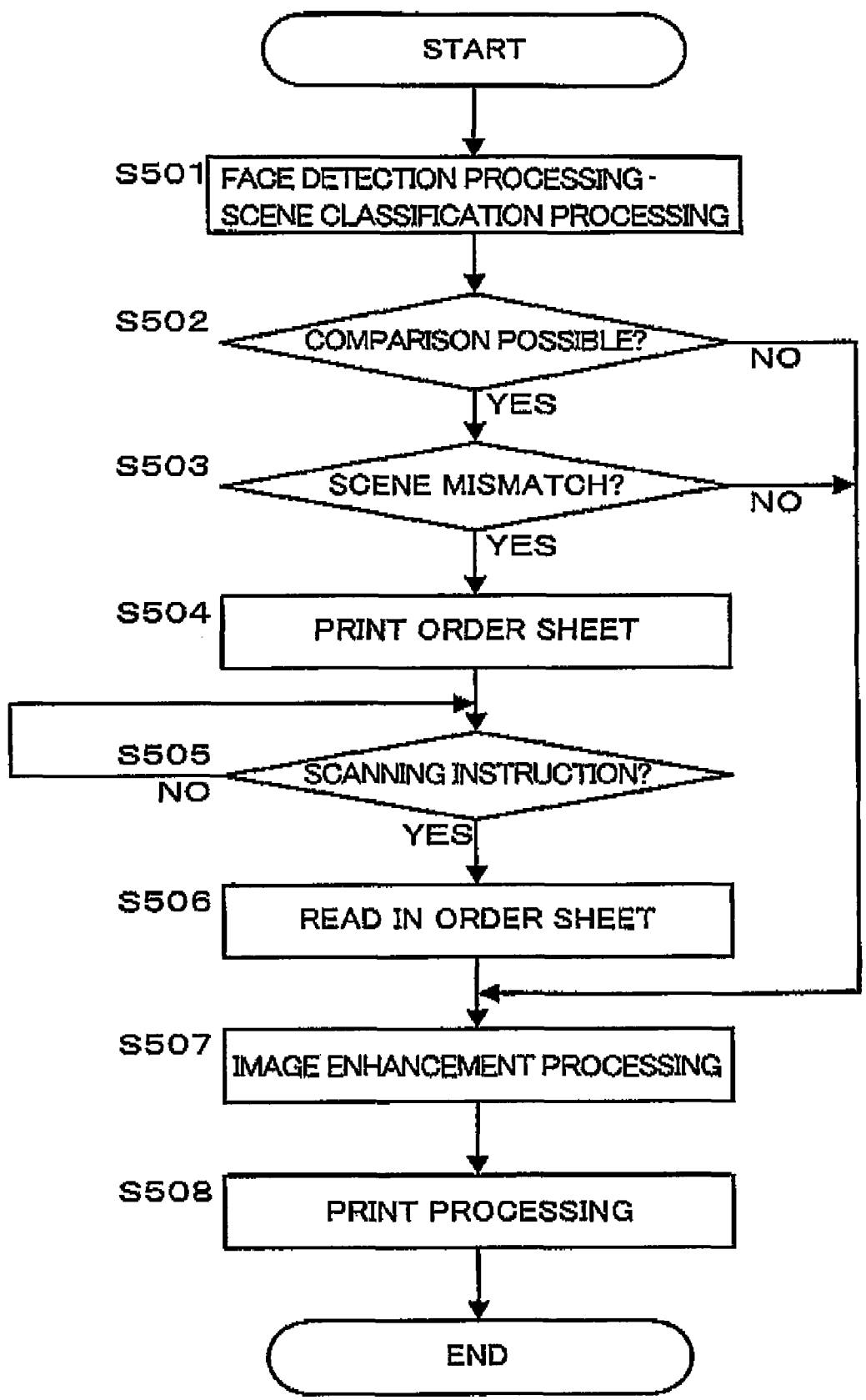
FIG. 22 is a flowchart showing the process flow of direct printing according to the first embodiment.
Figure 23A:
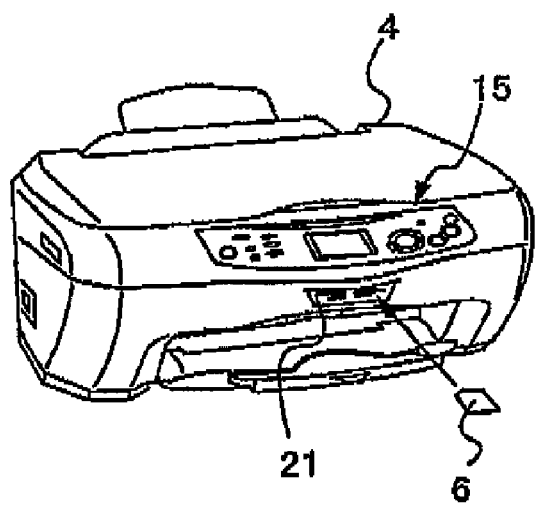
FIGS. 23A to 23C are explanatory diagrams illustrating how direct printing is carried out.
Figure 23B:
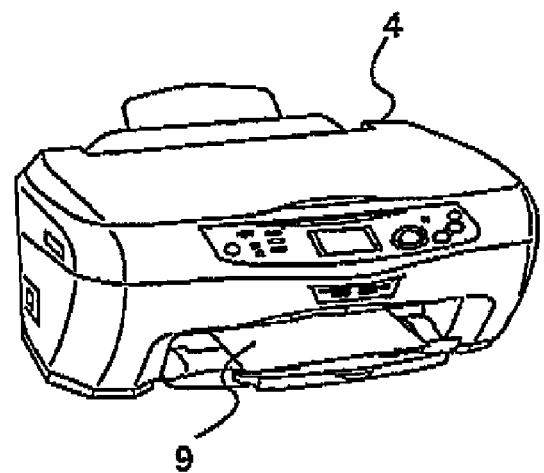
Figure 23C:
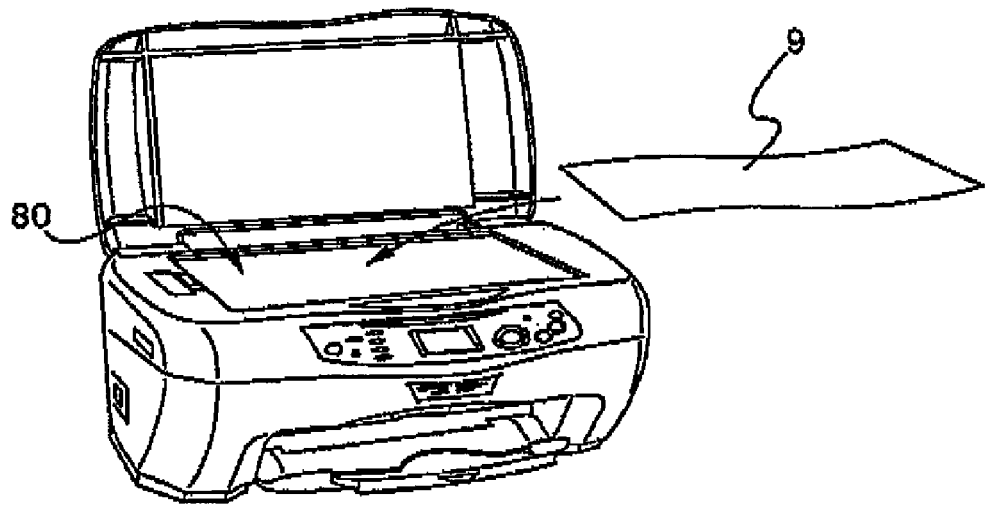

FIG. 22 is a flowchart showing the process flow of direct printing according to the first embodiment. The process steps are realized by the printer controller 20 based on a program stored in the memory 23. FIGS. 23A to 23C are explanatory diagrams illustrating how direct printing is carried out. As shown in FIG. 23A, when the memory card 6 is inserted into the slot 21, the printer controller 20 starts the direct print processing.

First, the printer controller 20 performs face detection processing with the face detection section 32 and scene classification processing with the scene classifier 33 (S501). These processes have already been explained above, so that further explanations thereof are omitted.

Next, the printer controller 20 judges whether the scene indicated by the supplemental data can be compared with the scene indicated by the classification processing result (S502). If a plurality of scene candidates are included in the classification processing results then the judgment is performed using the scene candidate with the highest degree of certainty.

It should be noted that the judgment method in S502 in the case that the scene capture type data is used for the judgment of a mismatch in the following step S503 differs from the case that the shooting mode data, which is MakerNote data, is used.

If the scene capture type data is used in S503, and the scene capture type data is none of "portrait", "landscape" and "night scene", for example when the scene capture type data is "0" (see FIG. 5), then it is not possible to compare it with the classification processing result in S503, so that the judgment in S502 is "NO". Also if the classification processing result is none of "portrait", "landscape" and "night scene", then it is not possible to compare it with the scene capture type data in S503, so that the judgment in S502 is "NO". For example, if the classification processing result is "sunset scene", then the judgment in S502 is "NO".

If the shooting mode data is used in S503, and the shooting mode data is none of "portrait", "landscape", "sunset scene" and "night scene", for example when the shooting mode data is "3 (close-up)" for example 315 (see FIG. 5), then it is not possible to compare it with the classification processing result, so that the judgment in S502 is "NO". Also if the classification processing result is none of "portrait", "landscape", "sunset scene" and "night scene", then it is not possible to compare it with the shooting mode data, so that the judgment in S502 is "NO".

If the judgment in S502 is "YES", then the printer controller 20 judges whether a mismatch between the scene indicated by the supplemental data (scene capture type data, shooting mode data) and the scene indicated by the classification processing result exists (S503). If a plurality of scene candidates are included in the classification processing result, then the judgment is performed using the scene candidate with the highest degree of certainty.

When there is a mismatch in S503 ("YES" in S503), then, by controlling the print mechanism 10, the printer controller 20 lets the print mechanism 10 print an order sheet (S504, see FIG. 23B). This order sheet is a printout for letting the user confirm based on which scene the image data should be enhanced, when a mismatch between the scene indicated by the supplemental data (scene capture type data, shooting mode data) and the scene indicated by the classification processing result exists.

Figure 24:
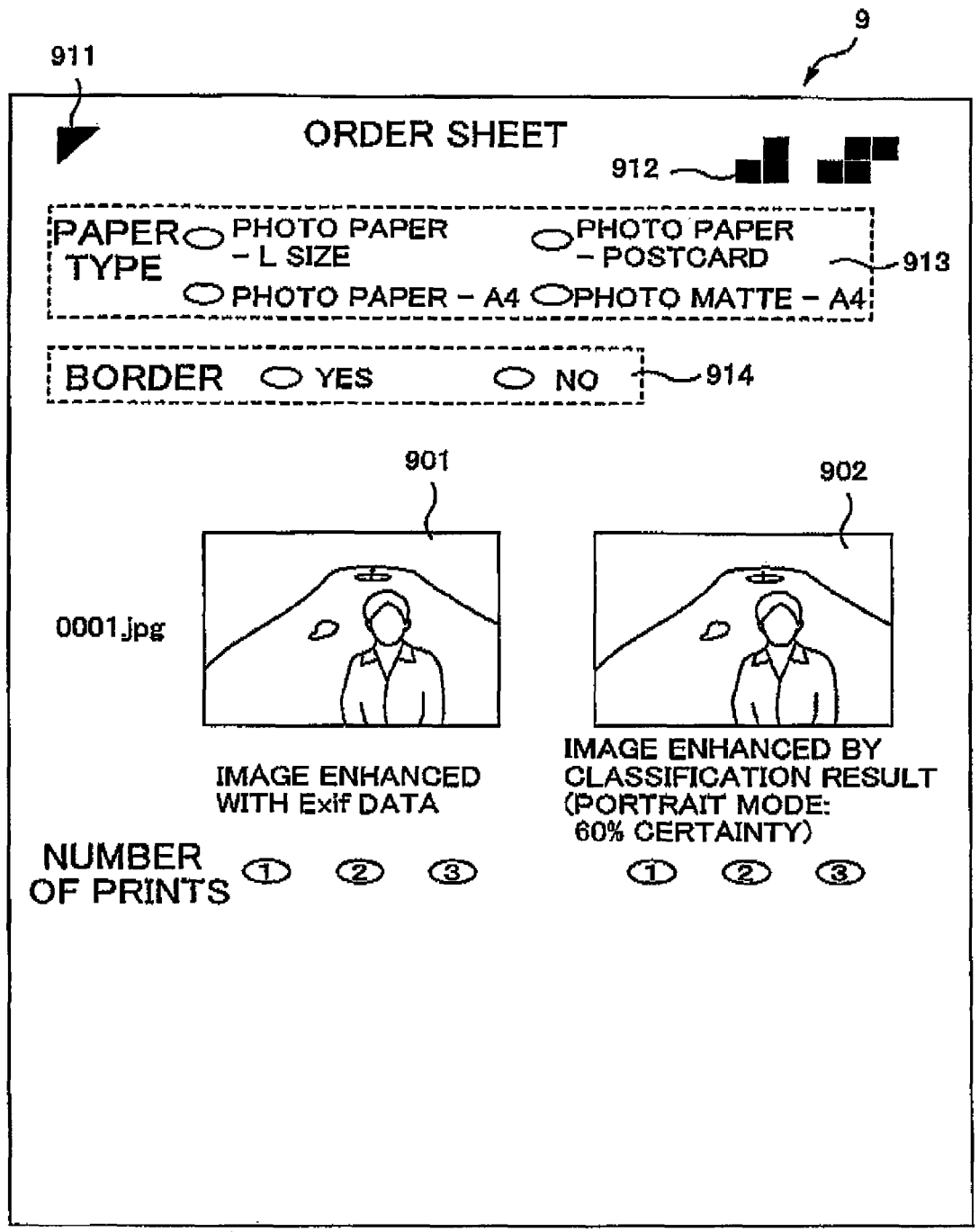
FIG. 24 is an explanatory diagram of an order sheet according to the first embodiment.

FIG. 24 is an explanatory diagram of an order sheet according to the first embodiment.

Two images expressing the image data are printed next to one another on this order sheet 9. The image 901 on the left side has been enhanced based on the scene indicated by the supplemental data, and here, an enhancement with the "landscape" mode has been carried out (see FIG. 7). The image 902 on the right side has been enhanced based on the scene indicated by the classification processing result, and here, an enhancement with the "portrait" mode has been carried out (see FIG. 7). The two images enhanced by different enhancement modes are printed next to each other on the order sheet, so that the user can easily compare the result of the enhancement processes. Moreover, as opposed to the case that the images are evaluated on the display section 16, which is a liquid crystal display, the result of the enhancement processing can be confirmed with actually printed images, so that the user can easily obtain printed images that are as desired. Furthermore, the degree of certainty of the classification processing result is indicated below the right side image 902. The images printed on the order sheet 9 are not large, so that printing the degree of certainty together with the image can supplement the material on which the user bases his decision.

Below each of the images, elliptical marks for giving an instruction of the number of desired prints are printed. By filling in the elliptical mark below the image subjected to the desired enhancement processing, the user can instruct the printer 4, which of the two enhancement processes is to be selected. For example, in order to instruct the printer 4 to print one image enhanced with the "portrait" mode, the user should fill in the elliptical mark "1" below the image 902 on the right side. It is also possible to instruct the printing of both images.

It should be noted that also a positioning mark 911 is printed on the order sheet 9. This positioning mark 911 indicates the orientation of the order sheet 9 when the order sheet 9 is placed on the platen glass or the scanner section 80 of the printer 4. That is to say, when the user places the order sheet 9 on the platen glass of the scanner section 80 of the printer 4 (see FIG. 23C), the order sheet 9 is set on the scanner section 80 in such a way that the positioning mark 911 points to a base position of the platen glass. The positioning mark 911 is used also for skew detection in the case that the order sheet 9 has been placed slantly on the scanner section 80.

Also an attribute mark 912 indicating attributes of the order sheet is printed on the order sheet 9. The attributes of the order sheet include the total number of prints of the order sheet, the page number of the order sheet, and the type of the order sheet. It should be noted that this attribute mark 912 is also used for skew detection, together with the positioning mark 911.

Moreover, the user can select the paper type with a paper type selection region 913 on the order sheet 9. Furthermore, with an edge selection region 914 on the order sheet 9, the user can select whether the image is to be printed by borderless printing without leaving a margin at the edge of the print paper, or whether the image is to be printed by bordered printing while leaving a margin at the edge of the print paper.

Thus, the user can instruct the printer of the desired printing conditions by selectively filling in with a pencil the elliptical marks printed on the order sheet 9. After filling out the order sheet 9, the user sets the order sheet 9 on the platen glass of the scanner section 80, as shown in FIG. 23C. Then, after the order sheet 9 has been set on the scanner section 80, the user operates the input section 17 of the panel section 15 (for example by pressing a scanner button), to let the scanner section 80 read in the order sheet 9 ("YES" in S505).

The printer controller 20 obtains the image data of the order sheet 9 from the scanner section 80, analyzes the image data, and classifies the marks filled in by the user (S506). Then, the printer controller 20 enhances the image data with the enhancement mode according to the user selection, in accordance with the marks filled in by the user (S507). For example, if the printer controller 20 classifies based on the image data obtained by reading in the order sheet that the elliptical mark "1" below the image 902 on the right side is filled in, then the image data of the image file subjected to direct printing is enhanced with the "portrait" mode (see FIG. 7).

It should be noted that in the case of "NO" in S502, a comparison in S503 is not possible, so that the process advances to S507. Furthermore, in the case of "NO" in S503, a confirmation by the user is unnecessary, so that the process advances to S507.

In S507, the printer controller 20 enhances the image data with a certain enhancement mode. If an elliptical mark filled in by the user is classified in S506, then the printer controller 20 enhances the image data based on the scene selected by the user. In the case of "NO" in S502 or S503, the printer controller 20 enhances the image data based on the scene of the classification processing result.

After the image enhancement processing, the printer controller 20 prints the image based on the enhanced image data (S508). Thus, a printed image of suitable image quality is obtained.

Second Embodiment

In the above-described first embodiment, an image enhanced based on the scene indicated by the supplemental data as well as an image enhanced based on the scene of the classification processing result are both printed on the order sheet, for the image data of one image. By contrast, in the second embodiment, one image is printed on the order sheet for the image data of one image.

Moreover, in the above-described first embodiment, there is one image file subjected to direct printing, whereas in the second embodiment, there are a plurality of image files subjected to direct printing.

Figure 25:
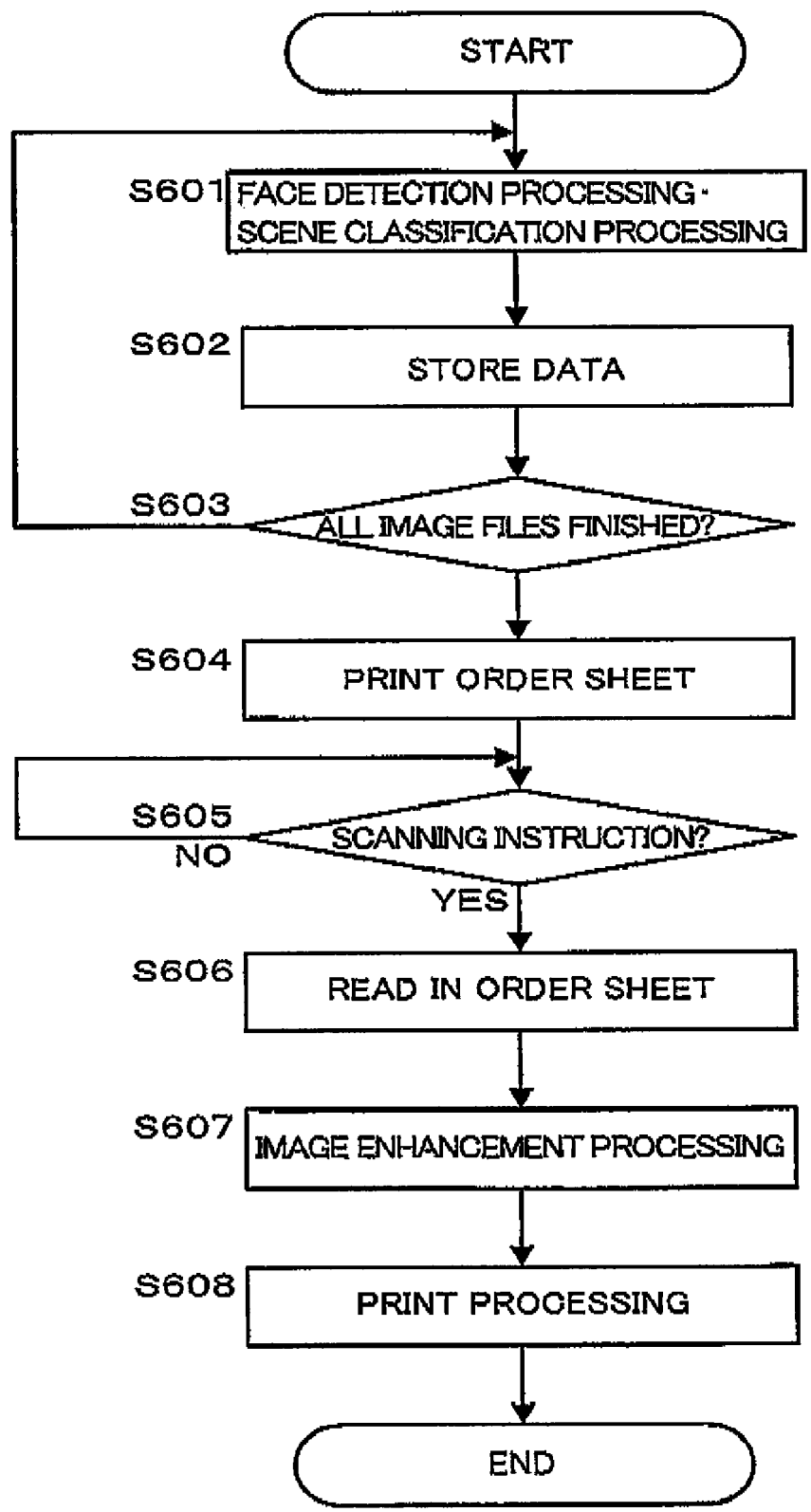
FIG. 25 is a flowchart showing the process flow of direct printing according to the second embodiment.

FIG. 25 is a flowchart showing the process flow of direct printing according to the second embodiment. The process steps are realized by the printer controller 20 based on a program stored in the memory 23. As shown in FIG. 23A, when the memory card 6 is inserted into the slot 21, the printer controller 20 starts the direct print processing. It should be noted that in the present embodiment, a plurality of image files are stored in the memory card 6.

First, the printer controller 20 performs face detection processing with the face detection section 32 and scene classification processing with the scene classifier 33 (S601). Then, the printer controller 20 stores the number of the image file and the processing result of the face detection processing and the scene classification processing in association with each other in the memory 23 (S602). The printer controller 20 performs these processes on all image files (S601 to S603). After the classification processing has been performed on all image files, the printer controller 20, by controlling the print mechanism 10, lets the print mechanism 10 print an order sheet (S504, see FIG. 23B).

Figure 26:
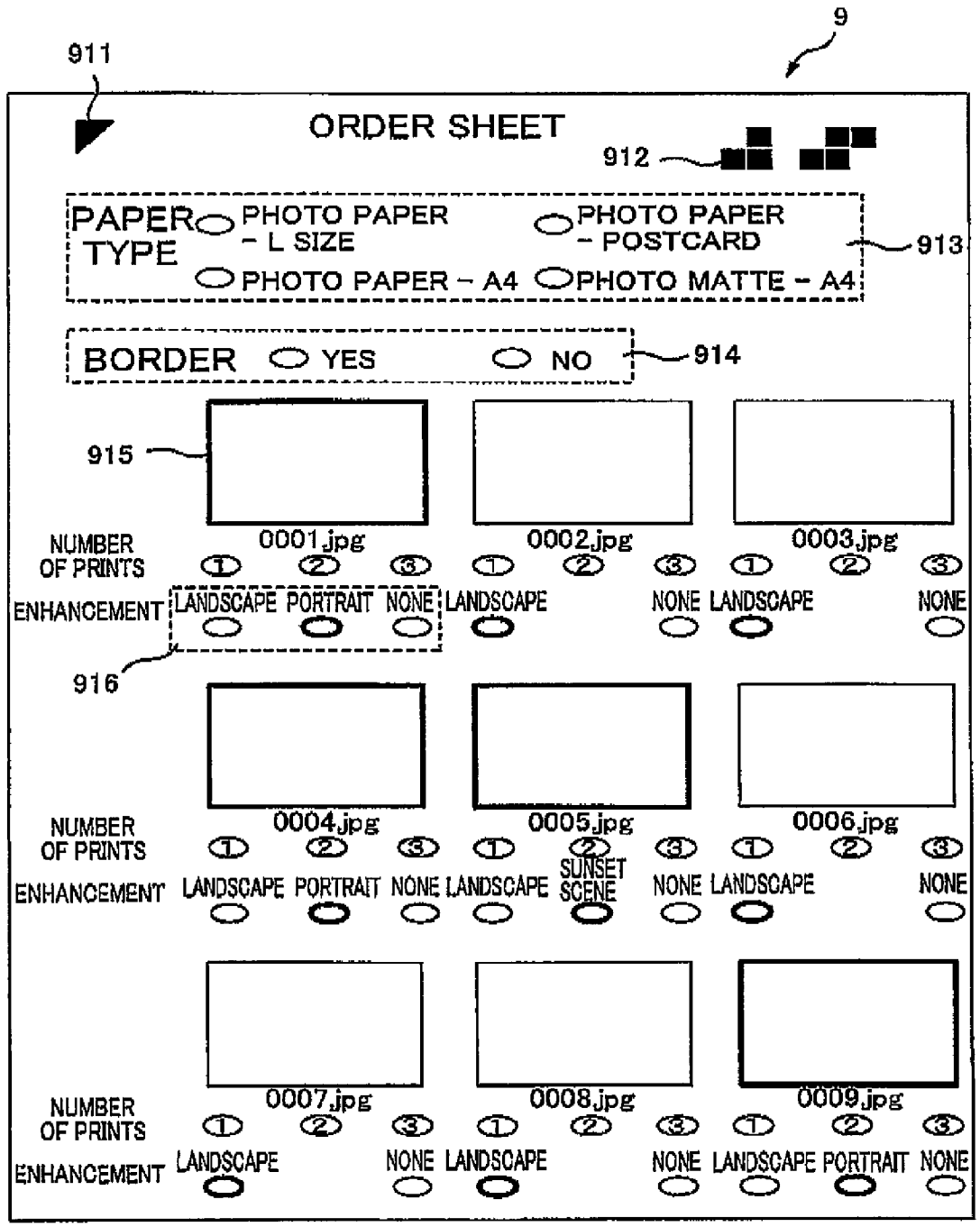
FIG. 26 is an explanatory diagram of an order sheet according to the second embodiment.

FIG. 26 is an explanatory diagram of an order sheet according to the second embodiment.

Nine images 915 are printed on this order sheet (in the figures, only rectangular frames are shown, but in reality, images are printed within these frames). These nine images 915 are images of nine image files from the plurality of image files to be subjected to direct printing. Since the space on which images can be printed is small, the images 915 are printed using the thumbnail image data of the image files (see FIG. 3). Also, since the printed images are small, it is difficult for the user to evaluate the image quality, so that the thumbnail image data is not subjected to any image enhancement. Below the images 915, the numbers of the image files are indicated. In the following explanations, the images are specified using the least significant digit of the number of the image file. For example, of the nine images on the order sheet, the image in the upper left is referred to as "first image", and the image file corresponding to this image is referred to as "first image file".

When a mismatch between the scene indicated by the supplemental data and the scene of the classification processing result exists, then the printer controller 20 prints the outer border of the image 915 as a bold frame. On the other hand, if the two scenes (the scene indicated by the supplemental data and the scene of the classification processing result) match, the printer controller 20 prints the outer border of the image 915 without a bold frame. Thus, the user can easily grasp, from whether the outer border of the image 915 is printed as a bold frame or not, for which of the images a mismatch between the two scenes exists (the scene indicated by the supplemental data and the scene indicated by the classification result).

Below each of the images 915, elliptical marks for giving an instruction of the number of desired prints are printed. And below that, enhancement instruction regions 916 for giving an instruction of the enhancement mode are provided.

There are enhancement instruction regions 916 that indicate three types of enhancement modes, such as the one for the first image, and enhancement instruction regions 916 that indicate two types of enhancement modes, such as the one for the second image. The images of the enhancement instruction regions 916 indicating three types of enhancement modes are images for which the scene indicated by the supplemental data does not match the scene of the classification processing result. The images of the enhancement instruction regions 916 indicating two enhancement modes are images for which the two scenes (the scene indicated by the supplemental data and the scene of the classification processing result) match. Thus, the user can easily grasp, from the number of elliptical marks in the enhancement instruction regions 916, for which of the images the two scenes (the scene indicated by the supplemental data and the scene indicated by the classification result) do not match.

If the two scenes (the scene indicated by the supplemental data and the scene of the classification processing result) do not match, the printer controller 20 prints three elliptical marks in the enhancement instruction region 916. The three elliptical marks are, from left to right, an elliptical mark for giving an instruction of the scene indicated by the supplemental data, an elliptical mark for giving an instruction of the scene indicated by the classification processing result, and an elliptical mark for giving an instruction that no enhancement is desired. Moreover, in order to indicate to the user that enhancement processing is carried out based on the scene of the classification processing result when the user has not selected the enhancement model the elliptical mark for giving an instruction of the scene of the classification processing result of the enhancement instruction region 916 is printed with a bold line. For example, in the first image, if an elliptical mark for giving an instruction of the number of prints has been filled in but no elliptical mark for giving an instruction of the enhancement mode has been filled in, then enhancement processing will be carried out in the "portrait" mode.

If the two scenes (the scene indicated by the supplemental data and the scene of the classification processing result) match, the printer controller 20 prints two elliptical marks in the enhancement instruction region 916. The two elliptical marks are, from left to right, an elliptical mark for giving an instruction of the scene indicated by the classification processing result (which is also the scene indicated by the supplemental data), and an elliptical mark for giving an instruction that no enhancement is desired. Moreover, in order to indicate that enhancement processing is carried out based on the scene of the classification processing result when the user has not selected the enhancement mode, the elliptical mark for giving an instruction of the scene of the classification processing result of the enhancement instruction region 916 is printed with a bold line.

On the order sheet in the figure, the outer borders of the first, fourth, fifth, and ninth images 915 are printed as a bold frame. Moreover, three elliptical marks are printed in the enhancement instruction regions 916 of the first, fourth, fifth, and ninth images 915. Therefore, it can be seen that the scene of the supplemental data and the scene of the classification result do not match for the first, fourth, fifth, and ninth image files. On the other hand, the outer border of the second, third, and sixth to eighth images is not printed with a bold line. Moreover, only two elliptical marks are printed in the enhancement instruction regions 916 of the second, third, and sixth to eighth images 915. Therefore, it can be seen that the scene of the supplemental data and the scene of the classification result match for the second, third, and sixth to eighth image files.

Then, like in the first embodiment, the user can instruct the printer of the desired printing conditions by selectively filling in with a pencil the elliptical marks printed on the order sheet 9. After filling out the order sheet 9, the user sets the order sheet 9 on the platen glass of the scanner section 80, as shown in FIG. 23C. Then, after the order sheet 9 has been set on the scanner section 80, the user operates the input section 17 of the panel section 15 (for example by pressing a scanner button), to let the scanner section 80 read in the order sheet 9 ("YES" in S605).

The printer controller 20 obtains the image data of the order sheet 9 from the scanner section 80, analyzes the image data, and classifies the marks filled in by the user (S606). Then, the printer controller 20 enhances the image data with the enhancement mode according to the user selection, in accordance with the marks filled in by the user (S607). After the image enhancement processing, the printer controller 20 prints the image based on the enhanced image data (S608). Thus, a printed image of suitable image quality is obtained.

Third Embodiment

In the third embodiment, only an image of the image files for which a mismatch between the scene of the supplemental data and the scene of the classification processing result exists is printed on the order sheet, and the printing of those files for which no such mismatch exists is carried out in advance. That is to say, compared to the second embodiment, the image files that are printed on the order sheet are different and the timing when the printing process begins is also different.

In the following explanations, it is assumed that the first to ninth image files are subjected to direct printing. Like in the second embodiment, the scene of the supplemental data does not match the scene of the classification result for the first, fourth, fifth, and ninth image files, whereas the scene of the supplemental data matches the scene of the classification result for the second, third, and sixth to eighth image files.

Figure 27:
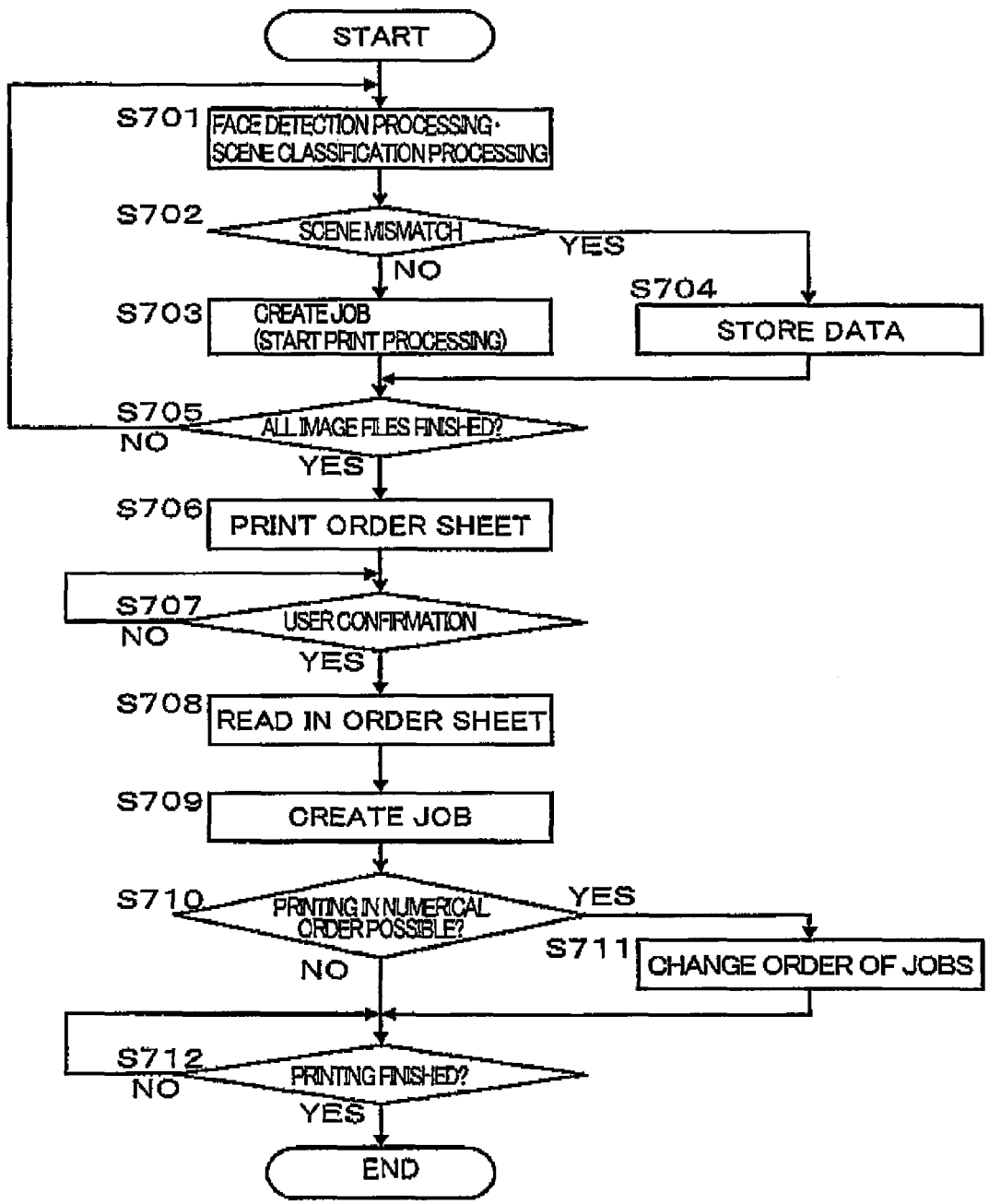
FIG. 27 is a flowchart showing the process flow of direct printing according to the third embodiment.

FIG. 27 is a flowchart showing the process flow of direct printing according to the third embodiment. The process steps are realized by the printer controller 20 based on a program stored in the memory 23.

First, the printer controller 20 obtains the first image file from the plurality of image files to be printed by direct printing, and subjects it to face detection processing and scene classification processing (S701). These processes have already been explained above, so that further explanations thereof are omitted.

Next, the printer controller 20 judges whether a mismatch between the scene indicated by the supplemental data (scene capture type data, shooting mode data) and the scene indicated by the classification processing result exists (S702). Also this judgment has already been explained above, so that further explanations thereof are omitted.

If the result of S702 is that there is a mismatch (YES), then the number of that image file and for example the classification processing result are stored in the memory 23 (S704). Then, the process advances to S705.

If the result of S702 is that there is no mismatch (NO), then the printer controller 20 creates the print job (referred to simply as "job" in the following) (S703). As for the content of that job, the image data is enhanced based on the scene of the classification processing result, and the printing process is carried out based on the enhanced image data. If a plurality of jobs have accumulated, then the printer controller 20 executes those jobs in order according to their degree of priority. When executing a job, the image data is enhanced based on a predetermined scene (here, the scene of the classification processing result) in accordance with the content of that job, and the printing process is carried out based on the enhanced image data. It should be noted that the printer controller 20 performs the processing in FIG. 27 in parallel also while executing a job.

If "YES" is judged in S702 for the first image file, then the printer controller 20 stores the image file number and the classification processing result (here, "landscape", if there are a plurality of scene candidates, those scene candidates) in the memory 23 (S704).

Next, the second to ninth image files are still left, so that "NO" is judged in S705, and the processing of S701 is carried out for the second image file.

If "NO" is judged in S702 for the second image file, the printer controller 20 creates a job for the second image file (S703). At this time, there is no other job, so that after creating the job, this job is executed immediately. That is to say, the image data of the second image file is subjected to an enhancement process, and the printing process is started based on the enhanced image data.

In this manner, the processing of S701 to S705 is carried out also for the remaining third to ninth image files. It should be noted that while the job of the second image file is executed, the printer controller 20 performs the processing of S701 to S705 for the third image file in parallel.

After the processing of S704 for the ninth image file has been performed, there are no further image files remaining, so that the printer controller 20 judges "YES" in S705. Then, the printer controller 20 prints the order sheet (S706).

Figure 28:
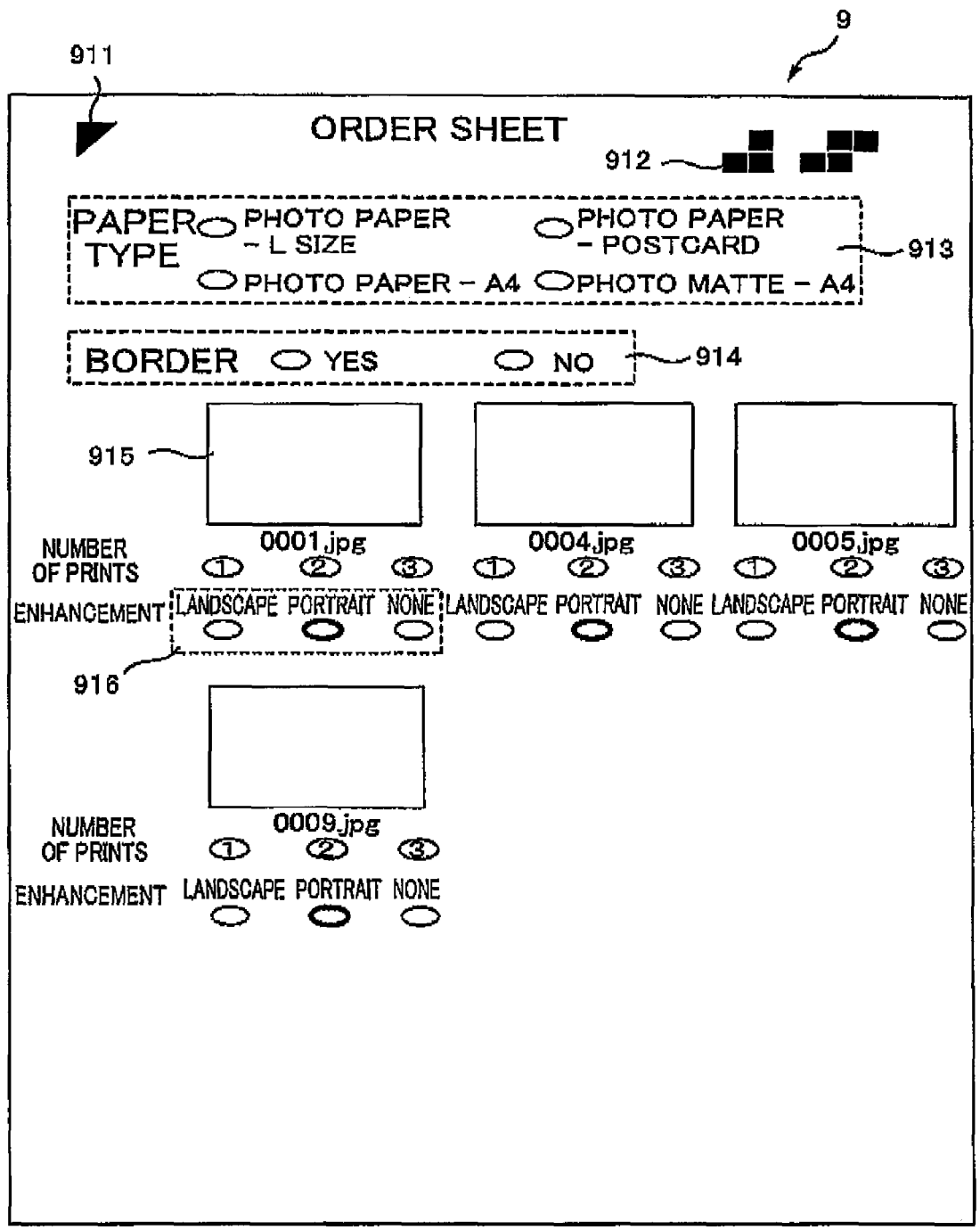
FIG. 28 is an explanatory diagram of an order sheet according to the third embodiment.

FIG. 28 is an explanatory diagram of an order sheet according to the third embodiment.

Four images 916 are printed on this order sheet (in the figures, only rectangular frames are shown, but in reality, images are printed within these frames). Based on the data stored in S704, the printer controller 20 judges which images should be printed on the order sheet. The four images 916 printed on the order sheet are the first, fourth, fifth, and ninth images, for which it has been judged in S702 that the scene indicated by the supplemental data (scene capture type data, shooting mode data) does not match the scene indicated by the classification processing result.

Then, like in the second embodiment, the user can instruct the printer of the desired printing conditions by selectively filling in with a pencil the elliptical marks printed on the order sheet 9. After filling out the order sheet 9, the user sets the order sheet 9 on the platen glass of the scanner section 80, as shown in FIG. 23C. Then, after the order sheet 9 has been set on the scanner section 80, the user operates the input section 17 of the panel section 15 (for example by pressing a scanner button), to let the scanner section 80 read in the order sheet 9 ("YES" in S707). The printer controller 20 obtains the image data of the order sheet 9 from the scanner section 80, analyzes the image data, and classifies the marks filled in by the user (S708). Here, let us assume that elliptical marks for instructing the printing of the first, fourth, fifth, and ninth image are filled in.

The printer controller 20 creates jobs based on the reading result at S708 (S709). Here, the printer controller 20 creates respective jobs for printing the first, fourth, fifth, and ninth image (S709). As for the content of those jobs, the image data is enhanced based on the scenes selected by the user, and the printing process is carried out based on the enhanced image data.

Next, the printer controller 20 judges whether it is in a state in which printing can be performed in numerical order (S710). More specifically, if the smallest number of the image files for which a job has been created in S709 is larger than the number of the image for which printing has already started, then the printer controller 20 judges that it is in a state in which printing can be performed in numerical order. Here, the smallest number of the image files for which jobs have been created in S709 (first, fourth, fifth, and ninth image files) is the number 1, and printing has already started for the second image, so that the judgment of S710 is "NO".

If the two scenes (the scene indicated by the supplemental data and the scene of the classification result) for the first image file would have matched, then jobs for printing the first to third images would be created in S703, and the printing of the first image would start ordinarily, it takes several seconds to several dozen seconds to print one image, so that if the instructions are entered fast with the order sheet, the jobs for the fourth, fifths and ninth image files are created (S709) before the printing of the first to third images has finished (before starting the printing of the sixth image). In this cases the printer controller 20 judges "YES" in S710, the order of jobs is changed (S711), and the priority order of the jobs is set to the order of the numbers of the image files. Thus, after printing the third image, the printer 4 prints the fourth image, and not the sixth image. Then, the user can obtain the printed images in the order of the numbers of the image files.

It should be noted that if the judgment in S710 is "NO", then the printer 4 does not print the images in the order of the numbers of the image files, so that the printer controller 20 may also display a warning screen to indicate this to the user on the display section 16. Moreover, if the printing order is displayed on this warning screen, then this is useful when the user changes the order of the printed images.

Then, the printer controller 20 executes the accumulated jobs in accordance with the priority order, and terminates the process when all jobs have been executed ("YES" in S712).

In accordance with this embodiment, printing can be started earlier.

Addition of Scene Information to Supplemental Data

If the user selects a scene on the order sheet, it is possible to establish the scene that is desired by the user. Accordingly, in the present embodiment, when the user has made a selection on the order sheet, the scene selected by the user is stored in the supplemental data of the image file. The following is an explanation of the case that the user has selected on the order sheet an image that is enhanced based on the scene of the classification processing result.

Figure 29:
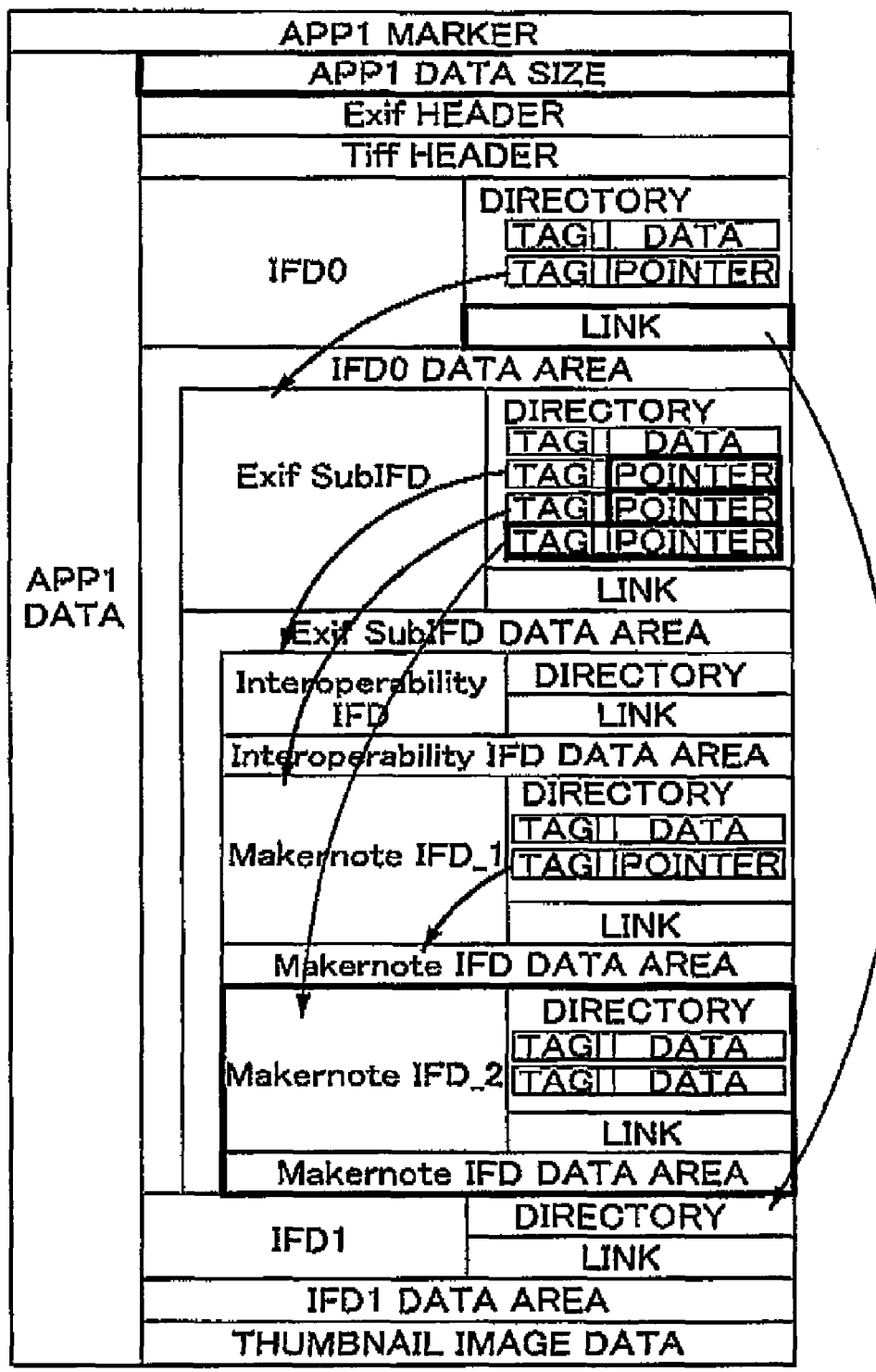
FIG. 29 is an explanatory diagram of a configuration of an APP1 segment when the classification result is added to the supplemental data.

FIG. 29 is an explanatory diagram of a configuration of an APP1 segment when the classification result is added to the supplemental data. In FIG. 29, portions different from those of the image file shown in FIG. 3 are indicated by bold lines.

Compared to the image file shown in FIG. 3, the image file shown in FIG. 29 has an additional Makernote IFD added to it. Information about the classification processing result is stored in this second Makernote IFD.

Moreover, a new directory entry is also added to the Exif SubIFD. The additional directory entry is constituted by a tag indicating the second Makernote IFD and a pointer pointing to the storage location of the second Makernote IFD.

Furthermore, since the storage location of the Exit SubIFD data area is displaced as a result of adding the new directory entry to the Exif SubIFD, the pointer pointing to the storage location of the Exif SubIFD data area is changed.

Furthermore, since the IFD1 area is displaced as a result of adding the second Makernote IFD, the link located in the IFD0 and indicating the position of the IFD1 is also changed. Furthermore, since there is a change in the size of the data area of APP1 as a result of adding the second Makernote IFD, the size of the data area of APP1 is also changed.

By saving the scene selected by the user (in this case, the scene of the classification processing result) in this manner in the additional data of the image file, it becomes unnecessary to perform classification processing or to print the order sheet again when printing the image of this image file. Moreover, when the user removes the memory card 6 from the printer 4 of the present embodiment and inserts the memory card 6 into another printer, the image data can be enhanced appropriately even when this printer is a printer not having the scene classification processing function but performing the automatic correction processing.

Other Embodiments

The foregoing embodiments were described primarily with regard to a printer. However, the foregoing embodiments are for the purpose of elucidating the present invention and are not to be interpreted as limiting the present invention. The invention can of course be altered and improved without departing from the gist thereof and includes functional equivalents. In particular, the embodiments mentioned below are also included in the scope of invention.

Regarding the Image File

The above-described image files are Exif format files. However, the image file format is not limited to this. Moreover, the above-described image files are still image files. However, the image files also may be moving image files. That is to say, as long as the image files contain the image data and the supplemental data, it is possible to perform the scene classification processing etc. as described above.

Regarding the Support Vector Machine

The above-described sub-classifiers 51 and sub-partial classifiers 61 employ a classification method using a support vector machine (SVM). However, the method for classifying whether or not the image to be classified belongs to a specific scene is not limited to a method using a support vector machine. For example, it is also possible to employ pattern recognition techniques, for example with a neural network.

Regarding the Method for Extracting Scene Candidates

In the above-described embodiments, if the scene cannot be classified by any of the overall classification processing, partial classification processing, and integrative classification processing, then scenes whose degree of certainty is equal to or greater than a predetermined value are extracted as scene candidates. However, the method for extracting scene candidates is not limited to this.

Figure 30:
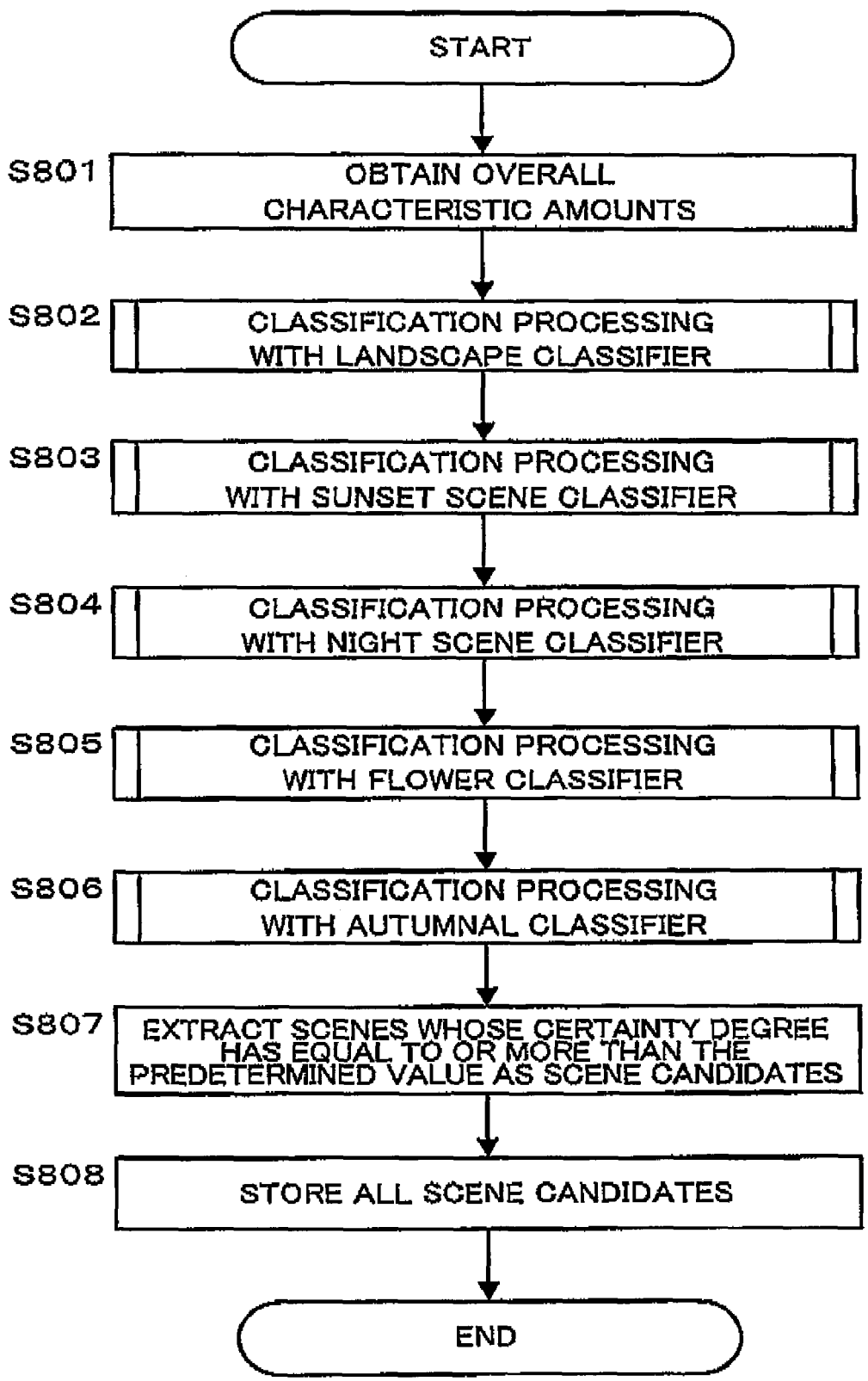
FIG. 30 is an explanatory diagram of a separate process flow.

FIG. 30 is an explanatory diagram of a separate process flow. This process can be carried out instead of the above-described scene classification processing.

First, as in the above-described embodiments, the printer controller 20 calculates the overall characteristic amounts, based on the information of the image file (S801). Then, like in the above-described classification processing, the landscape classifier 51L calculates the value of the discrimination equation or the Precision corresponding to this value as the degree of certainty (S802). It should be noted that the landscape classifier 51L of the above-described embodiment classifies whether or not the image to be classified belongs to landscape scenes, but here, the landscape classifier 51L only calculates the degree of certainty based on the discrimination equation. Similarly, also other the sub-classifiers 51 calculate degrees of certainty (S803 to S806). Then, the printer controller 20 extracts the scenes having a degree of certainty that is equal to or greater than a predetermined value as scene candidates (S807), and stores the scene candidates (and their degree of certainty) (S808).

Also in this manner, it is also possible to classify the scene of an image represented by image data. Then, the scene classified like this is compared with the scene of the supplemental data, and where a mismatch exists, it is also possible to print an order sheet.

Regarding the Order Sheet-1

In the above-described first embodiment, information relating to the image data of one image is printed on one order sheet. Moreover, in the above-described first embodiment, an image enhanced based on the scene indicated by the supplemental data as well as an loge enhanced based on the scene of the classification processing result are both printed on the order sheet, for the image data of one image. However, there is no limitation to this.

For example, when printing information relating to the image data of one image on one order sheet, it is also possible to print the image without enhancing it on the order sheet, or to print an enhancement instruction region for giving an instruction of the enhancement mode on the order sheet, as in the second embodiment.

Furthermore, when printing the information relating to the image data of one image on one order sheet, it is for example also possible to print not only an image that has been enhanced based on the scene indicated by the supplemental data or an image enhanced based on the scene of the classification processing result, but also an image that has not been enhanced.

Regarding the Order Sheet-2

In the above-described second embodiment, information relating to the image data of a plurality of images is printed on one order sheet. Moreover, in the second embodiment, an image that has not been enhanced is printed for the image data of one image. However, there is no limitation to this.

For example, when printing the information relating to the image data of a plurality of images on one order sheet, it is also possible to print, for the image data of one image, both an image that has been enhanced based on the scene indicated by the supplemental data and an image that has been enhanced based on the scene of the classification processing result, as in the first embodiment.

Furthermore, when printing the information relating to the image data of a plurality of images on one order sheet, it is for example also possible to print, for the image data of one image, not only an image that has been enhanced based on the scene indicated by the supplemental data or an image enhanced based on the scene of the classification processing result, but also an image that has not been enhanced.

Regarding the Enhancement Processing

In the foregoing embodiments, it was assumed that when a mismatch between the scene indicated by the supplemental data and the scene of the classification processing result exists, enhancement processing is carried out (or not carried out) based on one of those scenes. However, there is no limitation to this, and it is also possible to carry out enhancement processing based on the scene indicated by the supplemental data as well as enhancement processing based on the scene of the classification processing result. More specifically, it is possible to carry out an enhancement that improves skin colors with the "portrait" mode as well as an enhancement that emphasizes the blue color of the sky and the green color of trees with the "landscape" mode.

For example, when a mismatch between the scene indicated by the supplemental data and the scene of the classification processing result exists and the user has marked on the order sheet the instruction for an enhancement corresponding to the scene indicated by the supplemental data as well as the instruction for an enhancement corresponding to the scene of the classification processing result, then it is possible to carry out both enhancement processing based on the scene indicated by the supplemental data as well as enhancement processing based on the scene of the classification processing result.

Overview (1) In the above-described embodiments, the printer controller
obtains the scene capture type data and the shooting mode data, which are scene information, from the supplemental data appended to the image data. Moreover, the printer controller 20 obtains the classification result of the face detection processing and the scene classification processing (see FIG. 8).

The scene indicated by the scene capture type data and the shooting mode data may not match the scene of the classification result of the face detection processing or the scene classification processing. Accordingly, in the above-described embodiments, when a mismatch between the two scenes exists (the scene indicated by the supplemental data and the scene of the classification processing result), the printer controller 20 urges the user to make a confirmation by printing an order sheet (which is an example of a printout for urging the user to make a confirmation) (S504, S604, S706). Thus, the user can carry out a confirmation operation by filling in marks on the user sheet, so that the confirmation operation is simpler than the confirmation operation of selecting a scene by operating an operating panel.

(2) In the foregoing embodiments, the printer controller 20 reads in the content of the order sheet filled out by the user (S506, S606, S708), the image data is enhanced with the enhancement mode corresponding to the reading result (S507, S607, S709), and an image representing the enhanced image data is printed (S508, S608, S709). Thus, an image with the image quality desired by the user is obtained.

(3) In the above-described first embodiment, the printer controller 20 prints an image 901 enhanced based on the scene indicated by the supplemental data and an image 902 enhanced based on the scene of the classification processing result next to each other on the order sheet. Thus, the user can easily compare the results of the enhancement processing.

(4) In the above-describe second embodiment, the printer controller 20 decides for the image data of each of the plurality of images whether a match or a mismatch of the two scenes exists (the scene indicated by the supplemental data and the scene of the classification processing result), and when printing the order sheet, prints an image representing the respective image data while providing an enhancement instruction region 916 for the image data of each image. Then, the printer controller 20 prints three elliptical marks in the enhancement instruction region 916 of the image data for which the two scenes (the scene indicated by the supplemental data and the scene of the classification processing result) do not match. On the other hand, the printer controller 20 prints two elliptical marks in the enhancement instruction region 916 or the image data for which the two scenes (the scene indicated by the supplemental data and the scene of the classification processing result) match. Thus, letting the content printed in the enhancement instruction region 916 differ, the user can easily determine whether for which of the images a mismatch between the two scenes exists (the scene indicated by the supplemental data and the scene of the classification processing result).

(5) In the above-described second embodiment, the elliptical marks for giving an instruction of the scene of the classification processing result of the enhancement instruction region 916 are printed with bold lines for emphasis. This is to indicate to the user that if no enhancement mode is selected, enhancement processing based on the scene of the classification processing result is carried out. Then, if the user does not fill out the elliptical marks, the printer controller 20 enhances the image data based on the scene indicated by the elliptical mark printed with a bold line (in the case of the first image of the above-described second embodiment, this is "portrait"), and an image representing the enhanced image data is printed.

It should be noted that the method for emphasizing the marks is not limited to printing them with bold lines. That is to say, any method is appropriate with which the user can recognize which enhancement mode is automatically selected if no enhancement mode is selected by the user.

(6) In the above-described third embodiment, the printer controller 20 decides for the image data of each of the plurality of images whether a match or a mismatch of the two scenes exists (the scene indicated by the supplemental data and the scene of the classification processing result), and starts to carry out the printing for the image data for which the two scenes (the scene indicated by the supplemental data and the scene of the classification processing result) match, while printing the order, sheet for the image data for which a mismatch exists. Thus, the printing can be started earlier.

(7) In the above-described embodiments, when the user has made a selection on the order sheet, the printer controller 20 stores the scene selected by the user in the supplemental data of the image file. By saving the scene selected by the user in the supplemental data of the image file, it is possible to obviate the classification processing when printing the image of this image file again.

(8) The above-described printer 4 (corresponding to an information processing apparatus) includes the printer controller 20 (see FIG. 2). This printer controller 20 obtains the scene capture type data and the shooting mode data, which are the scene information, from the supplemental data appended to the image data. Moreover, the printer controller 20 obtains the classification result of the face detection processing and the scene classification processing (see FIG. 8). When a mismatch between the scene indicated by the scene capture type data or the shooting mode data a the scene of the classification result of the scene classification processing exists, the printer controller 20 prints an order sheet. Thus, the user can carry out a confirmation operation by filling in marks on the user sheet, so that the confirmation operation is simpler than the confirmation operation of selecting a scene by operating an operating panel.

(9) The above-mentioned memory 23 has a program stored therein, which causes the printer 4 to execute the processes shown in FIG. 22, 25, or 27. That is to say, this program includes code for acquiring scene information of image data from supplemental data appended to the image data, code for classifying the scene of an image represented by the image data based on that image data, code for comparing the scene indicated by the scene information with the classified scene, and code for printing an order sheet when a mismatch between the scene indicated by the scene information and the classified scene exists.

Although the preferred embodiment of the present invention has been described in detail, it should be understood that various changes, substitutions and alterations can be made therein without departing from spirit and scope of the inventions as defined by the appended claims.

What is claimed is:

1. A printing method comprising: obtaining scene information concerning image data from supplemental data that is appended to the image data;
   classifying a scene of an image represented by the image data, based on the image data;
   comparing the classified scene with a scene indicated by the scene information;
   printing a printout that is used to urge a user to make a confirmation when a mismatch between the classified scene and the scene indicated by the scene information exists;
   reading in a printout on which the user has filled out printing instructions;
   enhancing the image data based on at least one of the scene indicated by the scene information and the classified scene, in accordance with the result of the reading in; and
   printing an image represented by the enhanced image data, wherein
   the scene indicated by the scene information and the classified scene are compared for the image data of each of a plurality of images,
   for the image data of each of the images, an image represented by the image data of the plurality of images is printed on the printout and an instruction region is provided with which the user can give an instruction of a scene,
   in the instruction region of image data for which a mismatch between the scene indicated by the scene information and the classified scene exists, a mark used to give an instruction of the scene indicated by the scene information and a mark used to give an instruction of the classified scene are printed,
   in the instruction region of image data for which a match between the scene indicated by the scene information and the classified scene exists, a mark used to give an instruction of at least one of the scene indicated by the scene information and the classified scene is printed,
   in the instruction region of image data for which a mismatch between the scene indicated by the scene information and the classified scene exists, either one of the mark used to give an instruction of the scene indicated by the scene information and the mark used to give an instruction of the classified scene is printed in an emphasized manner, and
   when an image represented by image data for which a mismatch between the scene indicated by the scene information and the classified scene exists is printed, and neither the mark used to give an instruction of the scene Indicated by the scene information nor the mark used to give an instruction of the classified scene is filled out, then the image data is enhanced based on the scene indicated by the mark that is printed in an emphasized manner, and the image represented by this enhanced image data is printed.

2. A printing method according to claim 1, wherein the printing instructions is stored in the supplemental data in accordance with the result of the reading in.

3. A printing apparatus comprising:
a scene information obtaining section that obtains scene information concerning image data from supplemental data that is appended to the image data;
a classifier that classifies a scene of an image represented by the image data, based on the image data;
a comparator that compares the classified scene with a scene indicated by the scene information;
a printing section that prints a printout that is used to urge a user to make a confirmation when a mismatch between the classified scene and the scene indicated by the scene information exists;
a reading section that reads in a printout on which the user has filled out printing instructions; and
an enhancing section that enhances the image data based on at least one of the scene indicated by the scene information and the classified scene, in accordance with the result of the reading in, wherein
the printing section prints an image represented by the enhanced image data,
the scene indicated by the scene information and the classified scene are compared for the image data of each of a plurality of images,
for the image data of each of the images, an image represented by the image data of the plurality of images is printed on the printout and an instruction region is provided with which the user can give an instruction of a scene,
in the instruction region of image data for which a mismatch between the scene indicated by the scene information and the classified scene exists, a mark used to give an instruction of the scene indicated by the scene information and a mark used to give an instruction of the classified scene are printed,
in the instruction region of image data for which a match between the scene indicated by the scene information and the classified scene exists, a mark used to give an instruction of at least one of the scene indicated by the scene information and the classified scene is printed,
in the instruction region of image data for which a mismatch between the scene indicated by the scene information and the classified scene exists, either one of the mark used to give an instruction of the scene indicated by the scene information and the mark used to give an instruction of the classified scene is printed in an emphasized manner, and
when an image represented by image data for which a mismatch between the scene indicated by the scene information and the classified scene exists is printed, and neither the mark used to give an instruction of the scene Indicated by the scene information nor the mark used to give an instruction of the classified scene is filled out, then the image data is enhanced based on the scene indicated by the mark that is printed in an emphasized manner, and the image represented by this enhanced image data is printed.

4. A non-transitory storage medium storing a program that causes a printing apparatus to:
obtain scene information concerning image data from supplemental data that is appended to the image data;
classify a scene of an image represented by the image data, based on the image data;
compare the classified scene with a scene indicated by the scene information;
print a printout that is used to urge a user to make a confirmation when a mismatch between the classified scene and the scene indicated by the scene information exists;
read in a printout on which the user has filled out printing instructions;
enhance the image data based on at least one of the scene indicated by the scene information and the classified scene, in accordance with the result of the reading in; and
print an image represented by the enhanced image data, wherein
the scene indicated by the scene information and the classified scene are compared for the image data of each of a plurality of images,
for the image data of each of the images, an image represented by the image data of the plurality of images is printed on the printout and an instruction region is provided with which the user can give an instruction of a scene,
in the instruction region of image data for which a mismatch between the scene indicated by the scene information and the classified scene exists, a mark used to give an instruction of the scene indicated by the scene information and a mark used to give an instruction of the classified scene are printed,
in the instruction region of image data for which a match between the scene indicated by the scene information and the classified scene exists, a mark used to give an instruction of at least one of the scene indicated by the scene information and the classified scene is printed,
in the instruction region of image data for which a mismatch between the scene indicated by the scene information and the classified scene exists, either one of the mark used to give an instruction of the scene indicated by the scene information and the mark used to give an instruction of the classified scene is printed in an emphasized manner, and
when an image represented by image data for which a mismatch between the scene indicated by the scene information and the classified scene exists is printed, and neither the mark used to give an instruction of the scene indicated by the scene information nor the mark used to give an instruction of the classified scene is filled out, then the image data is enhanced based on the scene indicated by the mark that is printed in an emphasized manner, and the image represented by this enhanced image data is printed.

* * * * *